(12) United States Patent
Lopez et al.

(10) Patent No.: US 9,190,694 B2
(45) Date of Patent: Nov. 17, 2015

(54) HIGH CAPACITY ANODE MATERIALS FOR LITHIUM ION BATTERIES

(75) Inventors: Herman A. Lopez, Sunnyvale, CA (US); Yogesh Kumar Anguchamy, Newark, CA (US); Haixia Deng, Fremont, CA (US); Yongbong Han, San Francisco, CA (US); Charan Masarapu, Fremont, CA (US); Subramanian Venkatachalam, Pleasanton, CA (US); Sujeet Kumar, Newark, CA (US)

(73) Assignee: Envia Systems, Inc., Newark, CA (US)

( * ) Notice: Subject to any disclaimer, the term of this patent is extended or adjusted under 35 U.S.C. 154(b) by 296 days.

(21) Appl. No.: 12/938,951

(22) Filed: Nov. 3, 2010

(65) Prior Publication Data

US 2011/0111294 A1  May 12, 2011

Related U.S. Application Data

(60) Provisional application No. 61/257,728, filed on Nov. 3, 2009.

(51) Int. Cl.
*H01M 4/583* (2010.01)
*H01M 10/0525* (2010.01)
*H01M 4/134* (2010.01)
(Continued)

(52) U.S. Cl.
CPC .......... *H01M 10/0525* (2013.01); *H01M 4/134* (2013.01); *H01M 4/38* (2013.01); *H01M 4/505* (2013.01); *H01M 4/525* (2013.01); *H01M 4/621* (2013.01); *H01M 4/622* (2013.01); *Y02E 60/122* (2013.01)

(58) Field of Classification Search
CPC .................................................. H01M 4/583
USPC ................................................. 429/217, 188
See application file for complete search history.

(56) References Cited

U.S. PATENT DOCUMENTS

| 4,086,404 A | 4/1978 | Vissers et al. |
| 4,945,014 A | 7/1990 | Miyabayashi et al. |

(Continued)

FOREIGN PATENT DOCUMENTS

| CN | 101359734 A | 2/2009 |
| EP | 1912274 | 4/2008 |

(Continued)

OTHER PUBLICATIONS

Ruffo et al. J. Phys. Chem. C 2009, 113, 11390-11398.*

(Continued)

*Primary Examiner* — Patrick Ryan
*Assistant Examiner* — Alex Usyatinsky
(74) *Attorney, Agent, or Firm* — Peter S. Dardi; Dardi & Herbert, PLLC

(57) ABSTRACT

High capacity silicon based anode active materials are described for lithium ion batteries. These materials are shown to be effective in combination with high capacity lithium rich cathode active materials. Supplemental lithium is shown to improve the cycling performance and reduce irreversible capacity loss for at least certain silicon based active materials. In particular silicon based active materials can be formed in composites with electrically conductive coatings, such as pyrolytic carbon coatings or metal coatings, and composites can also be formed with other electrically conductive carbon components, such as carbon nanofibers and carbon nanoparticles. Additional alloys with silicon are explored.

14 Claims, 11 Drawing Sheets

(51) Int. Cl.
  *H01M 4/38*     (2006.01)
  *H01M 4/505*    (2010.01)
  *H01M 4/525*    (2010.01)
  *H01M 4/62*     (2006.01)

(56) References Cited

U.S. PATENT DOCUMENTS

| | | | |
|---|---|---|---|
| 5,147,739 A | 9/1992 | Beard | |
| 5,162,176 A | 11/1992 | Herr et al. | |
| 5,395,711 A | 3/1995 | Tahara et al. | |
| 5,436,093 A | 7/1995 | Huang et al. | |
| 5,443,601 A | 8/1995 | Doeff et al. | |
| 5,541,022 A | 7/1996 | Mizumoto et al. | |
| 5,595,837 A | 1/1997 | Olsen et al. | |
| 5,721,067 A | 2/1998 | Jacobs et al. | |
| 5,743,921 A | 4/1998 | Nazri et al. | |
| 5,753,388 A | 5/1998 | Koksbang et al. | |
| 5,792,577 A * | 8/1998 | Ejiri et al. | 429/232 |
| 5,948,569 A | 9/1999 | Moses et al. | |
| 6,025,093 A | 2/2000 | Herr | |
| 6,083,644 A | 7/2000 | Watanabe et al. | |
| 6,235,427 B1 | 5/2001 | Idota et al. | |
| 6,251,822 B1 | 6/2001 | Peng et al. | |
| 6,335,115 B1 | 1/2002 | Meissner | |
| 6,528,208 B1 | 3/2003 | Thackeray et al. | |
| 6,645,671 B2 | 11/2003 | Tsutsumi et al. | |
| 6,680,143 B2 | 1/2004 | Thackeray et al. | |
| 6,699,336 B2 | 3/2004 | Turner et al. | |
| 6,706,447 B2 | 3/2004 | Gao et al. | |
| 6,737,191 B2 | 5/2004 | Gan et al. | |
| 6,884,546 B1 | 4/2005 | Fujita et al. | |
| 6,899,970 B1 | 5/2005 | Rogers et al. | |
| 6,979,513 B2 | 12/2005 | Kelley et al. | |
| 7,037,581 B2 | 5/2006 | Aramata et al. | |
| 7,195,842 B1 | 3/2007 | Fujimoto et al. | |
| 7,235,330 B1 | 6/2007 | Fujimoto et al. | |
| 7,252,907 B2 | 8/2007 | Takeuchi et al. | |
| 7,276,314 B2 | 10/2007 | Gao et al. | |
| 7,297,446 B2 | 11/2007 | Fukui et al. | |
| 7,432,015 B2 | 10/2008 | Jeong et al. | |
| 7,452,632 B2 | 11/2008 | Lee et al. | |
| 7,514,369 B2 | 4/2009 | Li et al. | |
| 7,517,614 B2 | 4/2009 | Jeong et al. | |
| 7,563,541 B2 | 7/2009 | Howard et al. | |
| 7,582,387 B2 | 9/2009 | Howard et al. | |
| 7,588,623 B2 | 9/2009 | Dover et al. | |
| 7,615,314 B2 | 11/2009 | Kawakami et al. | |
| 7,658,863 B2 | 2/2010 | Aramata et al. | |
| 7,754,389 B2 | 7/2010 | Yamaguchi et al. | |
| 7,776,473 B2 | 8/2010 | Aramata et al. | |
| 7,790,316 B2 | 9/2010 | Aramata et al. | |
| 7,816,031 B2 | 10/2010 | Cui et al. | |
| 7,851,085 B2 | 12/2010 | Obrovac et al. | |
| 7,871,727 B2 | 1/2011 | Obrovac et al. | |
| 7,923,150 B2 | 4/2011 | Yamamoto et al. | |
| 8,486,549 B2 * | 7/2013 | Honda | H01M 4/0421 429/231.95 |
| 2001/0031396 A1 | 10/2001 | Tsutsumi et al. | |
| 2003/0135989 A1 | 7/2003 | Huggins et al. | |
| 2003/0157407 A1 | 8/2003 | Kosuzu et al. | |
| 2004/0023117 A1 | 2/2004 | Imachi et al. | |
| 2004/0033419 A1 | 2/2004 | Funabiki | |
| 2004/0146734 A1 | 7/2004 | Miller et al. | |
| 2004/0191630 A1 | 9/2004 | Kawamura et al. | |
| 2004/0241548 A1 | 12/2004 | Nakamoto et al. | |
| 2005/0026040 A1 | 2/2005 | Thackeray et al. | |
| 2005/0031942 A1 | 2/2005 | Hennige et al. | |
| 2005/0130043 A1 | 6/2005 | Gao et al. | |
| 2005/0175901 A1 | 8/2005 | Kawakami et al. | |
| 2005/0214644 A1 | 9/2005 | Aramata et al. | |
| 2005/0233213 A1 | 10/2005 | Lee et al. | |
| 2006/0035149 A1 | 2/2006 | Nanba et al. | |
| 2006/0040182 A1 | 2/2006 | Kawakami et al. | |
| 2006/0051677 A1 | 3/2006 | Matsushima et al. | |
| 2006/0078797 A1 | 4/2006 | Munshi | |
| 2007/0048612 A1 | 3/2007 | Nakajima et al. | |
| 2007/0148544 A1 | 6/2007 | Le | |
| 2007/0190413 A1 | 8/2007 | Lee et al. | |
| 2007/0207381 A1 | 9/2007 | Ohtsuka et al. | |
| 2007/0224508 A1 | 9/2007 | Aramata et al. | |
| 2008/0070120 A1 | 3/2008 | Miyawaki et al. | |
| 2008/0113269 A1 | 5/2008 | Yamamoto et al. | |
| 2008/0131772 A1 | 6/2008 | Jambunathan et al. | |
| 2008/0160265 A1 | 7/2008 | Hieslmair et al. | |
| 2008/0193831 A1 | 8/2008 | Mah et al. | |
| 2008/0213671 A1 | 9/2008 | Kogetsu et al. | |
| 2008/0226988 A1 * | 9/2008 | Minami et al. | 429/231.5 |
| 2008/0268347 A1 * | 10/2008 | Ohzuku et al. | 429/322 |
| 2008/0274408 A1 | 11/2008 | Jarvis et al. | |
| 2009/0023065 A1 | 1/2009 | Hwang et al. | |
| 2009/0029256 A1 | 1/2009 | Mah et al. | |
| 2009/0053608 A1 * | 2/2009 | Choi et al. | 429/231.95 |
| 2009/0092899 A1 | 4/2009 | Treger | |
| 2009/0117466 A1 | 5/2009 | Zhamu et al. | |
| 2009/0130562 A1 | 5/2009 | Mao et al. | |
| 2009/0169994 A1 | 7/2009 | Mah et al. | |
| 2009/0186267 A1 | 7/2009 | Tiegs | |
| 2009/0214952 A1 | 8/2009 | Wakita et al. | |
| 2009/0239151 A1 | 9/2009 | Nakanishi et al. | |
| 2009/0263707 A1 | 10/2009 | Buckley et al. | |
| 2009/0305131 A1 | 12/2009 | Kumar et al. | |
| 2009/0317721 A1 | 12/2009 | Shirane et al. | |
| 2009/0325061 A1 | 12/2009 | Lim | |
| 2010/0009261 A1 | 1/2010 | Watanabe | |
| 2010/0047671 A1 | 2/2010 | Chiang et al. | |
| 2010/0086853 A1 | 4/2010 | Venkatachalam et al. | |
| 2010/0086854 A1 | 4/2010 | Kumar et al. | |
| 2010/0119939 A1 | 5/2010 | Misumi et al. | |
| 2010/0119942 A1 | 5/2010 | Kumar | |
| 2010/0120179 A1 | 5/2010 | Zhamu et al. | |
| 2010/0151332 A1 | 6/2010 | Lopez et al. | |
| 2010/0159366 A1 | 6/2010 | Shao-Horn et al. | |
| 2010/0173198 A1 | 7/2010 | Zhamu et al. | |
| 2010/0178566 A1 | 7/2010 | Kogetsu et al. | |
| 2010/0243951 A1 | 9/2010 | Watanabe et al. | |
| 2010/0288970 A1 | 11/2010 | Watanabe et al. | |
| 2010/0330430 A1 | 12/2010 | Chung et al. | |
| 2011/0017528 A1 | 1/2011 | Kumar et al. | |
| 2011/0052981 A1 | 3/2011 | Lopez et al. | |
| 2011/0052989 A1 | 3/2011 | Venkatachalam et al. | |
| 2011/0076556 A1 | 3/2011 | Karthikeyan et al. | |
| 2011/0085960 A1 | 4/2011 | Mukasyan et al. | |
| 2011/0111298 A1 | 5/2011 | Lopez et al. | |
| 2011/0111304 A1 | 5/2011 | Cui et al. | |
| 2011/0136019 A1 | 6/2011 | Amiruddin et al. | |
| 2011/0244331 A1 | 10/2011 | Karthikeyan et al. | |
| 2012/0028105 A1 | 2/2012 | Kumar et al. | |
| 2012/0045670 A1 | 2/2012 | Stefan et al. | |
| 2012/0056590 A1 | 3/2012 | Amiruddin et al. | |
| 2012/0070725 A1 | 3/2012 | Venkatachalam et al. | |
| 2012/0105007 A1 | 5/2012 | Amiruddin et al. | |
| 2012/0107680 A1 | 5/2012 | Amiruddin et al. | |
| 2012/0121982 A1 | 5/2012 | Harimoto et al. | |
| 2012/0295155 A1 | 11/2012 | Deng et al. | |
| 2013/0078508 A1 | 3/2013 | Tolbert et al. | |

FOREIGN PATENT DOCUMENTS

| | | | |
|---|---|---|---|
| EP | 2071650 | 6/2009 | |
| EP | 2079120 A2 | 7/2009 | |
| EP | 2141759 A1 | 1/2010 | |
| JP | 2003017040 A | 1/2003 | |
| JP | 2004227988 A * | 8/2004 | H01M 4/58 |
| JP | 2007/294423 | 11/2007 | |
| JP | 2009/076372 | 4/2009 | |
| JP | 2009/076373 | 4/2009 | |
| JP | 2009252705 A | 10/2009 | |
| KR | 10-0493960 | 6/2005 | |
| WO | 2004/025757 A2 | 3/2004 | |
| WO | 2005/011030 A1 | 2/2005 | |
| WO | 2005/031898 A1 | 4/2005 | |
| WO | 2005/065082 A2 | 7/2005 | |
| WO | 2005/076389 A2 | 8/2005 | |
| WO | 2006/109930 A1 | 10/2006 | |

(56) References Cited

FOREIGN PATENT DOCUMENTS

| WO | WO 2008025188 | * | 3/2008 |
|---|---|---|---|
| WO | 2009011132 A1 | | 1/2009 |
| WO | 2011/053736 A1 | | 5/2011 |

OTHER PUBLICATIONS

Wang et al J. Electrochem. Soc., 1998, vol. 145, No. 8, 2751-2758.*

Chan et al., "High-performance lithium battery anodes using silicon nanowires," Nature Nanotechnology Jan. 2008, vol. 3, pp. 31-35.

Chen et al., "Electrochemical Insertion/extraction of Lithium in Multiwall Carbon Nanotube/Sb and SnSb0.5 Nanocomposites," published by the Massachusetts Institute of Technology, division of Molecular Engineering of Biological and Chemical Systems, Dec. 2003.

Cui et al., "Carbon-silicon core-shell nanowires as high capacity electrode for lithium ion batteries," Nano Lett. 9 (9):3370-3374 (2009) (Abstract only).

Kang et al., "Enhancing the rate capability of high capacity xLi2MnO3—(1-x)LiMO2 (M=Mn, Ni, Co) electrodes by Li-Ni-PO4 treatment," Electrochemistry Communications 11:748-751 (2009).

Kang et al., Layered Li(Li0.2Ni0.15+0.5zCo0.10Mn0.55-0.5z)O2-zFz cathode materials for Li-ion secondary batteries, Journal of Power Sources 146:654-657 (2005).

Kim et al., Synthesis of spherical Li{ni(1/3-z)Co(1/3-z)Mn(1/3-z)Mgz]O2 as positive electrode material for lithium ion battery, Electrochimica Acta 51:2447-2453 (2006).

Kim et al., Improvement of High-Voltage Cycling Behavior of Surface Modified Li[Ni1/3Co1/3Mn1/3]O2 Cathodes by Fluorine Substitution for Li-Ion Batteries, Journal of the Electrochemical Society 152 (9) A1707-A1713 (2005).

Lee et al., "High capacity Li[Li0.2Ni0.2Mn0.6]O2 cathode materials via a carbonate co-precipitation method," J. of Power Sources, 162:1346-1350 (2006).

Liu et al., "Improvement of cycling stability of Si anode by mechanochemical reduction and carbon coatings." Journal of Power Sources, 189, pp. 480-484 (2009).

Liu et al., "Electrical transport in doped multiwalled carbon nanotubes," Physical Review B, vol. 63,161404(R), pp. 1-4 (2001).

Schoenenberger et al., "Multiwall carbon nanotubes," http://physicsworld.com/cws/article/print/606 (printed Oct. 7, 2009).

Shi et al., "Nano-SnSb alloy deposited on MCMB as an anode material for lithium ion batteries," J. Materials Chemistry, 11(5):1502-1505 (2001).

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "Significant Improvement of high voltage cycling behavior AlF3-coated LiCoO2 cathode," Electrochemistry Communications 8:821-826 (2006).

Thackeray et al., "Comments on the structural complexity of lithium-rich Li1+xM1-xO2 electrodes (M=Mn,Ni,Co) for lithium batteries," Electrochemistry Communications 8:1531-1538 (2006).

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Yang et al., "Nanosized silicon-based composite derived by in situ mechanochemical reduction for lithium ion batteries," Journal of Power Sources, 164, pp. 880-884 (2007).

Yoshio et al., "Electrochemical behaviors of silicon based anode material," Journal of Power Sources 146:10-14 (2005) (Abstract).

Search Report and Written Opinion for corresponding International Application No. PCT/US2010/055265, mailed Jul. 29, 2011 (9 pages).

Chiang et al., "High Capacity, Temperature-Stable Lithium Aluminum Manganese Oxide Cathodes for Rechargeable Batteries," Electrochemical and Solid State Letters, 2(3) 107-110 (1999).

Ito et al., Cyclic deterioration and its improvement for Li-rich layered cathode material Li [Ni0.17Li0.2Co0.07Mn0.56]O2, Journal of Power Sources, 195:567-573 (2010).

Ito et al., "A new approach to improve the high-voltage cyclic performance of Li-rich layered cathode material by electrochemical pre-treatment," Journal of Power Sources,183:344-346 (2008).

Yakovleva et al., "Stabilized Lithium Metal Powder, Enabling Material and Revolutionary Technology for High Energy Li-ion Batteries"—2010 DOE Vehicle Technologies Program Review (Presentation, 34 pages).

"For More Charge Use Li, for Maximum Charge, Use FMC's SLMP™ Technology," Product Brochure, FMC Corporation 2008 (1 page).

Office Action for corresponding Taiwan Patent Application No. 099137857, mailed May 9, 2013.

Liu et al., "Electrochemical characterization of a novel Si-graphite-Li2.6Co0.4N composite as anode material for lithium secondary batteries," Materials Chemistry and Physics, 89:80-84 (2005).

Supplementary European Search Report from corresponding European Patent Application No. 10829011.5, mailed Mar. 24, 2014 (16 pages).

Office Action Translation from corresponding Japanese Patent Application No. 2012-537964, issued Aug. 5, 2014 (4 pages).

* cited by examiner

HIGH CAPACITY ANODE MATERIALS FOR LITHIUM ION BATTERIES

CROSS REFERENCE TO RELATED APPLICATIONS

This application claims priority to U.S. provisional patent application Ser. No. 61/257,728 filed on Nov. 3, 2009 to Lopez et al., entitled "High Energy Density Lithium Battery," incorporated herein by reference.

GOVERNMENT RIGHTS

Development of the inventions described herein was at least partially funded with government support through U.S. Department of Energy grant ARPA-E-DE-AR0000034, and the U.S. government has certain rights in the inventions.

FIELD OF THE INVENTION

The invention relates to high capacity negative electrode active materials based on silicon for lithium ion batteries. The invention further relates to batteries formed with silicon based negative electrode active materials and high capacity lithium rich positive electrode active materials as well as to silicon-based lithium ion batteries with a supplemental lithium source.

BACKGROUND OF THE INVENTION

Lithium batteries are widely used in consumer electronics industry due to their high energy density. For some current commercial batteries, the negative electrode material can be graphite, and the positive electrode materials can comprise lithium cobalt oxide ($LiCoO_2$), lithium manganese oxide ($LiMn_2O_4$), lithium iron phosphate ($LiFePO_4$), lithium nickel oxide ($LiNiO_2$), lithium nickel cobalt oxide ($LiNiCoO_2$), lithium nickel cobalt manganese oxide ($LiNiMnCoO_2$), lithium nickel cobalt aluminum oxide ($LiNiCoAlO_2$) and the like. For negative electrodes, lithium titanate is an alternative to graphite with good cycling properties, but it has a lower energy density. Other alternatives to graphite, such as tin oxide and silicon, have the potential for providing increased energy density. However, some high capacity negative electrode materials have been found to be unsuitable commercially due to high irreversible capacity loss and poor discharge and recharge cycling related to structural changes and anomalously large volume expansions, especially for silicon, that are associated with lithium intercalation/alloying. The structural changes and large volume changes can destroy the structural integrity of the electrode, thereby decreasing the cycling efficiency.

New positive electrode active materials are presently under development that can significantly increase the corresponding energy density and power density of the corresponding batteries. Particularly promising positive electrode active materials are based on lithium rich layered-layered compositions. In particular, the improvement of battery capacities can be desirable for vehicle applications, and for vehicle applications the maintenance of suitable performance over a large number of charge and discharge cycles is important.

SUMMARY OF THE INVENTION

In a first aspect, the invention pertains to a lithium ion battery comprising a positive electrode comprising a lithium metal oxide, a negative electrode, a separator between the positive electrode and the negative electrode and supplemental lithium, wherein the negative electrode comprises silicon having a specific capacity of at least about 500 mAh/g at a rate of C/3.

In a further aspect, the invention pertains to a lithium ion battery comprising a positive electrode comprising a lithium metal oxide, a negative electrode, and a separator between the positive electrode and the negative electrode, wherein the negative electrode comprises silicon, electrically conductive components and a polymer binder, wherein the negative electrode has a density of silicon active material of at least about 0.6 g/cm$^3$ and can generate a capacity per unit area of at least about 3.5 mAh/cm$^2$.

In additional aspects, the invention pertains to a lithium ion battery comprising a positive electrode comprising a lithium metal oxide, a negative electrode, and a separator between the positive electrode and the negative electrode, wherein the negative electrode comprises silicon, electrically conductive components and a polymer binder, wherein the negative electrode comprises a silicon based active material, a polymer binder and from about 2 weight percent to about 30 weight percent carbon fiber, the carbon fiber having an average diameter from about 25 nm to about 250 nm and an average length from about 2 microns to about 25 microns and wherein the negative electrode has an average dry thickness of at least about 25 microns.

In other aspects, the invention pertains to a lithium ion battery comprising a positive electrode comprising a lithium metal oxide, a negative electrode, a separator between the positive electrode and the negative electrode and optional supplemental lithium, wherein the negative electrode comprises a silicon based active material, electrically conductive components and a polymer binder, wherein the binder has an elongation of at least about 50% without tearing and a tensile strength of at least about 100 MPa.

Furthermore, the invention pertains to a lithium ion battery comprising a positive electrode comprising a lithium metal oxide, a negative electrode, a separator between the positive electrode and the negative electrode and optional supplemental lithium, wherein the negative electrode comprises a silicon based active material, electrically conductive components and a polymer binder, wherein the amount of active materials are balanced such that a reference positive electrode capacity and a reference negative electrode capacity are within about 5 percent of each other, wherein the reference positive electrode capacity is the sum of any capacity supplied by the supplemental lithium plus the positive electrode capacity evaluated with a lithium foil counter electrode from 4.6V to 2V at a rate of C/20 and the reference negative electrode capacity is evaluated against lithium foil from 0.01V to 1.5V at a rate of C/20.

In other embodiments, the invention pertains to a composite material comprising pyrolytic carbon coating, nanostructured silicon, and carbon nanofibers or graphitic carbon.

Moreover, the invention pertains to a lithium ion battery comprising a positive electrode comprising a lithium metal oxide, a negative electrode comprising a silicon-based active material, and a separator between the positive electrode and the negative electrode, wherein after 50 charge-discharge cycles between 4.5V and 1.0V, the battery exhibits at least about 750 mAh/g of negative electrode active material and at least about 150 mAh/g of positive electrode active material.

DETAILED DESCRIPTION OF THE INVENTION

Figure 1:
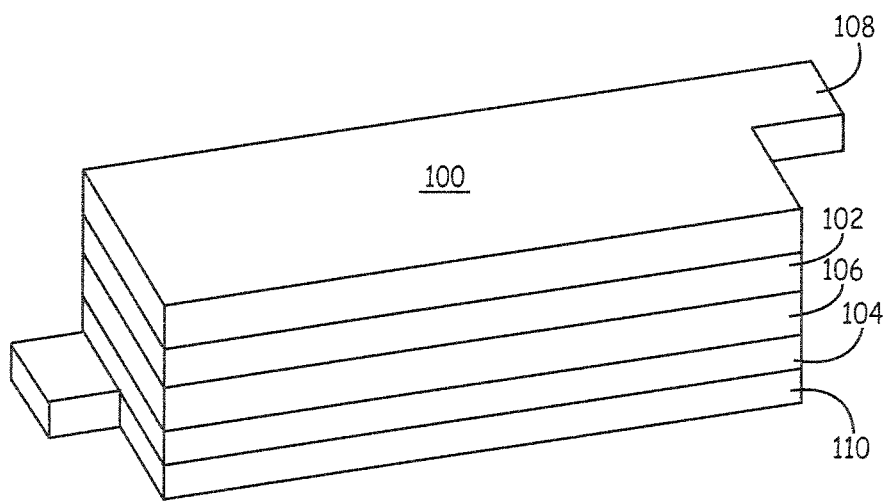
FIG. 1 is a schematic perspective view of a battery stack with a cathode and anode and a separator between the cathode and anode.

Desirable battery materials for negative electrodes for lithium ion batteries have been developed based on silicon, which can be nanostructured and/or formed in composites. In some embodiments, corresponding lithium ion batteries can comprise supplemental lithium that can serve several purposes. In particular, supplemental lithium can compensate for relatively large irreversible capacity losses from a silicon-based negative electrode as well as stabilizing high capacity lithium rich positive electrode active materials. For relevant embodiments, suitable nanostructured silicon includes, for example, nano-particulate silicon as well as nano-porous silicon particles. In some embodiments, the composites can comprise a carbon component, such as a nano-scale carbon (fibers or particles), graphitic carbon and/or a pyrolytic carbon coating. Desirable pyrolytic carbon coatings can be formed from organic compositions that can be applied with a solvent to obtain a relatively uniform coating prior to and after pyrolizing the organic composition to form the carbon coating. An elemental metal coating can be applied as an alternative to a carbon coating. The resulting high capacity negative electrode materials can be effectively cycled with a high capacity lithium rich positive electrode active material. The resulting lithium ion batteries can have high specific capacities for both the negative electrode active material, and the positive electrode active material.

Lithium has been used in both primary and secondary batteries. An attractive feature of lithium metal for battery use is its light weight and the fact that it is the most electropositive metal, and aspects of these features can be advantageously captured in lithium-based batteries also. Certain forms of metals, metal oxides, and carbon materials are known to incorporate lithium ions into its structure through intercalation, alloying or similar mechanisms. Lithium ion batteries have generally referred to batteries in which the negative electrode active material is also a lithium intercalation/alloying material.

If elemental lithium metal itself is used as the anode or negative electroactive material, the resulting battery generally is referred to as a lithium battery. Lithium batteries can initially cycle with good performance, but dendrites can form upon lithium metal deposition that eventually can breach the separator and result in failure of the battery. As a result, commercial lithium-based secondary batteries have generally avoided the deposition of lithium metal through the use of a negative electrode active material that operates through intercalation/alloying or the like above the lithium deposition voltage and with a slight excess in negative electrode capacity relative to the cathode or positive electrode. If the negative electrode comprises a lithium intercalation/alloying composition, the battery can be refereed to as a lithium ion battery.

The batteries described herein are lithium ion batteries that use a non-aqueous electrolyte solution which comprises lithium ions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Unless indicated otherwise, performance values referenced herein are at room temperature.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

When lithium ion batteries are in use, the uptake and release of lithium from the positive electrode and the negative electrode induces changes in the structure of the electroactive material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss is the difference between the charge capacity of the new battery and the first discharge capacity. The irreversible capacity loss results in a corresponding decrease in the capacity, energy and power for the cell due to changes in the battery materials during the initial cycle.

As described below, supplemental lithium can be included in the battery to compensate for the loss of cycling capacity resulting from an irreversible capacity loss. In a traditional lithium ion battery, the lithium for cycling is supplied only by a positive electrode active material comprising lithium. The battery is initially charged to transfer lithium from the positive electrode to the negative electrode where it is then available for discharge of the battery. Irreversible capacity loss may be associated with irreversible changes to the material during an initial charge/discharge cycle.

Elemental silicon has attracted significant amount of attention as a potential negative electrode material due to its very high specific capacity with respect to intake and release of lithium. Silicon forms an alloy with lithium, which can theoretically have a lithium content corresponding with more than 4 lithium atoms per silicon atom (e.g., $Li_{4.4}Si$). Thus, the theoretical specific capacity of silicon is on the order of 4000-4400 mAh/g, which is significantly larger than the theoretical capacity of about 370 mAh/g for graphite. Graphite is believed to intercalate lithium to a level of roughly 1 lithium atom for 6 carbon atoms ($LiC_6$). Also, elemental silicon, silicon alloys, silicon composites and the like can have a low potential relative to lithium metal similar to graphite. However, silicon undergoes a very large volume change upon alloying with lithium. A large volume expansion on the order of two to three times of the original volume or greater has been observed, and the large volume changes have been correlated with a significant decrease the cycling stability of batteries having silicon-based negative electrodes.

Also, elemental silicon in a negative electrode of a lithium-based battery is observed to have a large irreversible capacity loss (IRCL) in the first charge/discharge cycle of the battery. The high IRCL of a silicon-based anode can consume a significant portion of the capacity available for the battery's energy output. Since the cathode, i.e., positive electrode, supplies all of the lithium in a traditional lithium ion battery, a high IRCL in the anode, i.e., negative electrode, can result in a low energy battery. In order to compensate for the large anode IRCL, excess cathode material can be used to supply the extra lithium and properly balance the cell which results in a more expensive and lower energy density cell. As described herein, supplemental lithium can alternatively supply lithium and corresponding capacity that is lost due to the high IRCL of the silicon-based materials. Also, the design of the silicon-based materials can be selected to result in a reduced IRCL. Supplemental lithium has also been found to stabilize lithium rich high capacity positive electrode active materials.

Lithium rich layered-layered metal oxides have been found to cycle with relatively high specific capacities as a positive electrode active material. These layered-layered materials are looking very promising for commercial applications as a new generation of high capacity positive electrode active material. The overall performance of the battery is based on the capacities of both the negative and positive electrodes and their relative balance. An improvement in the specific capacity of the negative electrode active material can be more significant in the context of overall battery design when a higher capacity positive electrode active material is used in the battery. Having a high capacity cathode material means that using only a fraction of the weight of a high capacity cathode in a battery can result in the same energy density as a $LiCoO_2$ battery. Using less cathode material to obtain the same performance reduces the price and weight of the battery. From this perspective, the combination of the lithium rich layered-layered positive electrode active material with high capacity silicon based negative electrode active material can provide particularly desirable overall battery performance.

Supplemental lithium can replace lithium that does not cycle due to an irreversible capacity loss of the negative electrode. Furthermore, it has been discovered that the inclusion of supplemental lithium can stabilize positive electrodes based on lithium rich layered-layered lithium metal oxide compositions. In particular, for these lithium rich metal oxides, the supplemental lithium can stabilize the capacity of the positive electrode compositions out to large number of cycles. This improvement in cycling of the positive electrode active material is described further in copending U.S. patent application Ser. No. 12/938,073, now published U.S. patent application Ser. No. 2012/0107680 A1 to Amiruddin et al., entitled "Lithium Ion Batteries With Supplemental Lithium," (hereinafter "the supplemental lithium application") incorporated herein by reference.

The layered-layered lithium metal oxides, which provide a relatively large specific capacity, exhibit a significant irreversible capacity loss associated with changes to the material during the initial charge of the battery. Irreversible capacity loss associated with the positive electrode may result in lithium that can get deposited in the negative electrode but which cannot be later intercalated into the positive electrode active material. This excess lithium from the positive electrode is separate from any supplemental lithium introduced into the battery since the battery is assembled with the lithium metal oxide fully loaded with lithium pending the initial charge of the battery.

The supplemental lithium can be provided to the negative electrode in various ways. In particular suitable approaches include, for example, introducing elemental lithium into the battery, the incorporation of a sacrificial material with active lithium that can be transferred to the negative electrode active material, or preloading of lithium into the negative electrode active material. After the initial charge, supplemental lithium is associated with the negative electrode active material although a portion of the lithium can be associated with irreversible reaction byproducts, such as the solid electrolyte interphase layer.

The introduction of elemental lithium in association with the anode, i.e., negative electrode, can be an appropriate way to introduce supplemental lithium. In particular, elemental lithium powder or foil can be associated with the negative electrode to supply the supplemental lithium. In some embodiments, an elemental lithium powder can be placed on the surface of the electrode. A supplemental lithium source, such as elemental lithium, within the negative electrode generally can initiate reaction with the silicon based active material upon contact of the electrode with electrolyte since the reaction is spontaneous as long as electrical conductivity is supported within the electrode structure.

In alternative or additional embodiments, a supplemental lithium source can be associated with the positive electrode, i.e., cathode, or with a separate sacrificial electrode. If a supplemental lithium source is associated with the positive electrode or a separate sacrificial electrode, current flows between the electrode with the supplemental lithium and the negative electrode to support the respective half reactions that ultimately results in the placement of the supplemental lithium within the negative electrode active material, with possibly a fraction of the supplemental lithium being consumed in side reactions, such as formation of an SEI layer or other reactions leading to irreversible capacity loss.

In further embodiments, the supplemental lithium can be placed into the negative electrode active material prior to construction of the battery. For example, prior to assembly of the battery, supplemental lithium can be inserted into the active material through electrochemical intercalation/alloying. To perform the electrochemical deposition, the silicon-based electrode can be assembled into a structure with electrolyte and the supplemental lithium source, such as lithium foil. If the elemental lithium is in electrical contact with the active material in the presence of electrolyte, the reaction of the elemental lithium with the active alloying/intercalation material can occur spontaneously. Alternatively, the structure can be assembled into a cell with electrolyte and a separator separating the silicon-based electrode and an electrode with the supplemental lithium, such as a lithium foil. Current flow through the cell can be controlled to provide for the lithium incorporation into the silicon-based electrode. After deposition of a desired amount of lithium, the silicon-based electrode can be taken and assembled into the ultimate lithium ion battery.

For graphitic carbon based electrodes, the electrodes are found to have extractable lithium after essentially fully discharging the batteries having a lithium metal oxide positive electrode active material after cycling for relatively large numbers of cycles. The lithium is supplied in the batteries from the positive electrode active material as well as the supplemental lithium. This residual lithium is found to stabilize the battery cycling when used with lithium rich positive electrode active materials. Also, the amount of residual lithium is found to gradually diminish with larger numbers of cycles. Based on the measurements for the graphitic carbon electrodes, it is anticipated that the silicon based electrodes with supplemental lithium will exhibit residual lithium that can be extracted form the electrodes after discharging the battery with a lithium metal oxide positive electrode. See the supplemental lithium application referenced above.

Nanostructured silicon has been proposed to better accommodate a large volume change associated with formation of a silicon lithium alloy while exhibiting reduced degradation of the performance of a corresponding battery with cycling. Suitable nanostructured silicon includes, for example, nanoporous silicon and nanoparticulate silicon. As described herein with respect to some embodiments, nanostructured silicon can be formed into composites with carbon and/or alloys with other metal elements. The objective for the design of improved silicon-based materials is to further stabilize the negative electrode materials over cycling while maintaining a high specific capacity and in some embodiments reducing the irreversible capacity loss in the first charge and discharge cycle. As described herein, pyrolytic carbon coatings are also observed to stabilize silicon-based materials with respect to battery performance.

With respect to the composite materials, nanostructured silicon components can be combined with, for example, carbon nanoparticles and/or carbon nanofibers. The components can be, for example, milled to form the composite, in which the materials are intimately associated. Generally, it is believed that the associate has a mechanical characteristic, such as the softer silicon coated over or mechanically affixed with the harder carbon materials. In additional or alternative embodiments, the silicon can be milled with metal powders to form alloys, which may have a corresponding nanostructure. The carbon components can be combined with the silicon-metal alloys to form multi-component composites.

Desirable carbon coatings can be formed by pyrolyzing organic compositions. The organic compositions can be pyrolyzed at relatively high temperatures, e.g., about 800° C. to about 900° C., to form a hard amorphous coating. In some embodiments, the desired organic compositions can be dissolved in a suitable solvent, such as water and/or volatile organic solvents for combining with the silicon based component. The dispersion can be well mixed with silicon-based composition. After drying the mixture to remove the solvent, the dried mixture can be heated in an oxygen free atmosphere to pyrolyze the organic composition, such as organic polymers, some lower molecular solid organic compositions and the like, and to form a carbon coating. The carbon coating can lead to surprisingly significant improvement in the capacity of the resulting material. Also, environmentally friendly organic compositions, such as sugars and citric acid, have been found to be desirable precursors for the formation of pyrolytic carbon coatings. Elemental metal coatings, such as silver or copper, can be applied as an alternative to a pyrolytic carbon coating to provide electrical conductivity and to stabilize silicon-based active material. The elemental metal coatings can be applied through solution based reduction of a metal salt.

The high capacity silicon based materials are of particular value in combination with a high capacity positive electrode active material. Generally, the anode and cathode are relatively balanced so that the battery does not involve significant waste with associated cost of unused electrode capacity as well as for the avoidance of corresponding weight and volume associated with unused electrode capacity. It can be possible to get high capacity results simultaneously for both electrodes in the lithium ion battery. Furthermore, cycling capacity of both electrodes can independently fade, and the capacities of both electrodes are subject to irreversible capacity loss. The positive electrodes with lithium rich layered-layered compositions can exhibit a significant first cycle irreversible capacity loss. However, high capacity silicon-based anodes can generally exhibit contributions to IRCL significantly greater than the positive electrode active material. The design of the negative electrode active materials can be selected to reduce the IRCL, which can be significant with respect to reducing the excess anode balance in the cell design. Also, the positive electrode active material can similarly be designed to reduce IRCL associated with the positive electrode. Furthermore, supplemental lithium can be used as a substitute for additional capacity of the positive electrode to compensate for the relatively large IRCL of the negative electrode. With appropriate stabilization of the negative electrode and positive electrode, a battery with high capacity materials in both electrodes can exhibit high specific capacities for both electrodes over at least a moderate number of cycles.

Lithium Ion Battery Structure

Lithium ion batteries generally comprise a positive electrode (cathode), a negative electrode (anode), a separator between the negative electrode and the positive electrode and an electrolyte comprising lithium ions. The electrodes are generally associated with metal current collectors, such as metal foils. Lithium ion batteries refer to batteries in which the negative electrode active material is a material that takes up lithium during charging and releases lithium during discharging. Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104. The basic battery structures and compositions are described in this section and modifications related to incorporation of supplemental lithium are described further below.

The nature of the positive electrode active material and the negative electrode active material influences the resulting voltage of the battery since the voltage is the difference between the half cell potentials at the cathode and anode. Suitable positive electrode active materials are described below, and the materials of particular interest are lithium metal oxides. Suitable negative electrode lithium intercalation/alloying compositions can include, for example, graphite, synthetic graphite, coke, fullerenes, other graphitic carbons, niobium pentoxide, tin alloys, silicon, silicon alloys, silicon-based composites, titanium oxide, tin oxide, and lithium titanium oxide, such as $Li_xTiO_2$, $0.5<x\leq1$ or $Li_{1+x}Ti_{2-x}O_4$, $0\leq x\leq 1/3$. Graphitic carbon and metal oxide negative electrode compositions take up and release lithium through an intercalation or similar process. Silicon and tin alloys form alloys with the lithium metal to take up lithium and release lithium from the alloy to correspondingly release lithium. Negative electrode active materials of particular interest are described in detail below.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride, polyimide, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. In particular, thermally curable polyimide polymers have been found desirable, which may be due to their high mechanical strength. The following table provides suppliers of polyimide polymers, and names of corresponding polyimide polymers.

| Supplier | Binder |
| --- | --- |
| New Japan Chemical Co., Ltd. | Rikacoat PN-20 |
| | Rikacoat EN-20 |
| | Rikacoat SN-20 |
| HD MicroSystems | PI-2525 |
| | PI-2555 |
| | PI-2556 |
| | PI-2574 |
| AZ Electronic Materials | PBI MRS0810H |
| Ube Industries. Ltd. | U-Varnish S |
| | U-Varnish A |
| Maruzen petrochemical Co., Ltd. | Bani-X (Bis-allyl-nadi-imide) |
| Toyobo Co., Ltd. | Vyromax HR16NN |

With respect to polymer properties, some significant properties for electrode application are summarized in the following table.

| Binder | Elongation (%) | Tensile Strength (MPa) | Elastic Modulus (psi) | Viscosity (P) |
| --- | --- | --- | --- | --- |
| PVDF | 5-20 | 31-43 | 160000 | 10-40 |
| Polyimide | 70-100 | 150-300 | | 40-60 |
| CMC | 30-40 | 10-15 | | 30 |

PVDF refers to polyvinylidene fluoride, and CMC refers to sodium carboxy methyl cellulose. The elongation refers to the percent elongation prior to tearing of the polymer. In general, to accommodate the silicon based materials, it is desirable to have an elongation of at least about 50% and in further embodiments at least about 70%. Similarly, it is desirable for the polymer binder to have a tensile strength of at least about 100 MPa and in further embodiments at least about 150 MPa. Tensile strengths can be measured according to procedures in ASTM D638-10 Standard Test Method for Tensile Properties of Plastics, incorporated herein by reference. A person of ordinary skill in the art will recognize that additional ranges of polymer properties within the explicit ranges above are contemplated and are within the present disclosure. The particle loading in the binder can be large, such as greater than about 80 weight percent. To form the electrode, the powders can be blended with the polymer in a suitable liquid, such as a solvent for the polymer. The resulting paste can be pressed into the electrode structure.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders and polymer binders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure, such as, from about 2 to about 10 kg/cm² (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, and combinations thereof. Traditionally, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in copending U.S. patent application Ser. No. 12/630,992 filed on Dec. 4, 2009, now U.S. Pat. No. 8,993,177 B2 to Amiruddin et al. (the '992 application), entitled "Lithium Ion Battery With High Voltage Electrolytes and Additives," incorporated herein by reference.

The electrodes described herein can be incorporated into various commercial battery designs, such as prismatic shaped batteries, wound cylindrical batteries, coin batteries or other reasonable battery shapes. The batteries can comprise a single electrode stack or a plurality of electrodes of each charge assembled in parallel and/or series electrical connection(s). Appropriate electrically conductive tabs can be welded or the like to the current collectors, and the resulting jellyroll or stack structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used. Pouch batteries can be constructed as described in published U.S. patent application 2009/0263707 to Buckley et al, entitled "High Energy Lithium Ion Secondary Batteries", incorporated herein by reference.

Positive Electrode Active Compositions

In some embodiments, the lithium ion battery positive electrode materials can be any reasonable positive electrode active material, such as stoichiometric layered cathode materials with hexagonal lattice structures, such as $LiCoO_2$, $LiNiO_2$, $LiMnO_2$, or the like; cubic spinel cathode materials such as $LiMn_2O_4$, $LiNi_{0.5}Mn_{1.5}O_4$, $Li_4Mn_5O_{12}$, or the like; olivine $LiMPO_4$ (M=Fe, Co, Mn, combinations thereof and the like) type materials; layered cathode materials such as $Li_{1+x}(NiCoMn)_{0.33-x}O_2$ (0≤x<0.3) systems; layer-layer composites, such as $xLi_2MnO_3 \cdot (1-x)LiMO_2$ where M can be Ni, Co, Mn, combinations thereof and the like; and composite structures like layered-spinel structures such as $LiMn_2O_4 \cdot LiMO_2$. In additional or alternative embodiments, a lithium rich composition can be referenced relative to a composition $LiMO_2$, where M is one or more metals with an average oxidation state of +3. Generally, the lithium rich compositions can be represented approximately with a formula $Li_{1+x}M_{1-y}O_{2-z}F_z$ where M is one or more metal elements, x is from about 0.01 to about 0.33, y is from about x−0.2 to about x+0.2 with the proviso that y≥0, and z is from 0 to about 0.2. In the layered-layered composite compositions, x is approximately equal to y. In general, the additional lithium in the lithium rich compositions is accessed at higher voltages such that the initial charge takes place at a relatively higher voltage to access the additional capacity.

Lithium rich positive electrode active materials of particular interest can be represented approximately by a formula $Li_{1+b}Ni_\alpha Mn_\beta Co_\gamma A_\delta O_{2-z}F_z$, where b ranges from about 0.01 to about 0.3, α ranges from about 0 to about 0.4, β range from about 0.2 to about 0.65, γ ranges from 0 to about 0.46, δ ranges from 0 to about 0.15 and z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V, Li or combinations thereof. A person of ordinary skill in the art will recognize that additional ranges of parameter values within the explicit compositional ranges above contemplated and are within the present disclosure. To simplify the following discussion in this section, the optional fluorine dopant is not discussed further. Desirable lithium rich compositions with a fluorine dopant are described further in copending U.S. patent application Ser. No. 12/569,606, now U.S. Pat. No. 8,916,294 B2 to Kumar et al., entitled "Fluorine Doped Lithium Rich Metal Oxide Positive Electrode Battery Materials With High Specific Capacity and Corresponding Batteries," incorporated herein by reference. Compositions in which A is lithium as a dopant for substitution for Mn are described in copending U.S. patent application Ser. No. 12/870,295, now U.S. Pat. No. 8,475,959 B2 to Venkatachalam et al., entitled Lithium Doped Cathode Material," incorporated herein by reference. The specific performance properties obtained with +2 metal cation dopants, such as $Mg^{+2}$, are described in copending U.S. patent application Ser. No. 12/753,312, now U.S. Pat. No. 8,741,484 B2 to Karthikeyan et al., entitled "Doped Positive Electrode Active Materials and Lithium Ion Secondary Batteries Constructed Therefrom," incorporated herein by reference.

If $b+\alpha+\beta+\gamma+\delta$ is approximately equal to 1, the positive electrode material with the formula above can be represented approximately in two component notation as $x\ Li_2M'O_3.(1-x)LiMO_2$ where $0<x<1$, M is one or more metal cations with an average valance of +3 within some embodiments at least one cation being a Mn ion or a Ni ion and where M' is one or more metal cations, such as $Mn^{+4}$, with an average valance of +4. It is believed that the layered-layered composite crystal structure has a structure with the excess lithium supporting the stability of the material. For example, in some embodiments of lithium rich materials, a $Li_2MnO_3$ material may be structurally integrated with a layered $LiMO_2$ component where M represents selected non-lithium metal elements or combinations thereof. These compositions are described generally, for example, in U.S. Pat. No. 6,680,143 to Thackeray et al., entitled "Lithium Metal Oxide Electrodes for Lithium Cells and Batteries," incorporated herein by reference.

Recently, it has been found that the performance properties of the positive electrode active materials can be engineered around the specific design of the composition stoichiometry. The positive electrode active materials of particular interest can be represented approximately in two component notation as $x\ Li_2MnO_3.(1-x)\ LiMO_2$, where M is one or more metal elements with an average valance of +3 and with one of the metal elements being Mn and with another metal element being Ni and/or Co. In general, $0<x<1$, but in some embodiments $0.03 \leq x \leq 0.55$, in further embodiments $0.075 \leq x \leq 0.50$, in additional embodiments $0.1 \leq x \leq 0.45$, and in other embodiments $0.15 \leq x \leq 0.425$. A person of ordinary skill in the art will recognize that additional ranges within the explicit ranges of parameter x above are contemplated and are within the present disclosure. For example, M can be a combination of nickel, cobalt and manganese, which, for example, can be in oxidation states $Ni^{+2}$, $Co^{+3}$, and $Mn^{+4}$ within the initial lithium manganese oxides. The overall formula for these compositions can be written as $Li_{2(1+x)/(2+x)}Mn_{2x/(2+x)}M_{(2-2x)/(2+x)}O_2$. In the overall formula, the total amount of manganese has contributions from both constituents listed in the two component notation. Thus, in some sense the compositions are manganese rich.

In some embodiments, M can be written as $Ni_uMn_vCo_wA_y$. For embodiments in which $y=0$, this simplifies to $Ni_uMn_vCo_w$. If M includes Ni, Co, Mn, and optionally A the composition can be written alternatively in two component notation and single component notation as the following.

$$xLi_2MnO_3.(1-x)LiNi_uMn_vCo_wA_yO_2, \quad (1)$$

$$Li_{1+b}Ni_\alpha M_\beta Co_\gamma A_\delta O_2, \quad (2)$$

with $u+v+w+y\approx1$ and $b+\alpha+\beta+\gamma+\delta\approx1$. The reconciliation of these two formulas leads to the following relationships:

$$b=x/(2+x),$$

$$\alpha=2u(1-x)/(2+x),$$

$$\beta=2x/(2+x)+2v(1-x)/(2+x),$$

$$\gamma=2w(1-x)/(2+x),$$

$$\delta=2y(1-x)/(2+x),$$

and similarly, $$x=2b/(1-b),$$

$$u=a/(1-3b),$$

$$v=(\beta-2b)/(1-3b),$$

$$w=\gamma/(1-3b),$$

$$y=\delta/(1-3b).$$

In some embodiments, it may be desirable to have u v, such that $Li\ Ni_uMn_vCo_wA_yO_2$ becomes approximately $Li\ Ni_uMn_uCo_wA_yO_2$. In this composition, when $y=0$, the average valance of Ni, Co and Mn is +3, and if $u\approx v$, then these elements can have valances of approximately $Ni^{+2}$, $Co^{+3}$ and $Mn^{+4}$ to achieve the average valance. When the lithium is hypothetically fully extracted, all of the elements go to a +4 valance. A balance of Ni and Mn can provide for Mn to remain in a +4 valance as the material is cycled in the battery. This balance avoids the formation of $Mn^{+3}$, which has been associated with dissolution of Mn into the electrolyte and a corresponding loss of capacity.

In further embodiments, the composition can be varied around the formula above such that $Li\ Ni_{u+\Delta}Mn_{u-\Delta}Co_wA_yO_2$, where the absolute value of $\Delta$ generally is no more than about 0.3 (i.e., $-0.3 \leq \Delta \leq 0.3$), in additional embodiments no more than about 0.2 ($-0.2 \leq \Delta \leq 0.2$) in some embodiments no more than about 0.175 ($-0.175 \leq \Delta \leq 0.175$) and in further embodiments no more than about 0.15 ($-0.15 \leq \Delta \leq 0.15$). Desirable ranges for x are given above. With $2u+w+y\approx1$, desirable ranges of parameters are in some embodiments $0 \leq w \leq 1$, $0 \leq u \leq 0.5$, $0 \leq y \leq 0.1$ (with the proviso that both $u+\Delta$ and w are not zero), in further embodiments, $0.1 \leq w \leq 0.6$, $0.1 \leq u \leq 0.45$, $0 \leq y \leq 0.075$, and in additional embodiments $0.2 \leq w \leq 0.5$, $0.2 \leq u \leq 0.4$, $0 \leq y \leq 0.05$. A person of ordinary skill in the art will recognize that additional ranges of composition parameters within the explicit ranges above are contemplated and are within the present disclosure. As used herein, the notation (value1≤variable≤value2) implicitly assumes that value 1 and value 2 are approximate quantities. The engineering of the composition to obtain desired battery performance properties is described further in copending U.S. patent application Ser. No. 12/869,976, now U.S. Pat. No. 8,394,534 B2 to Lopez et al., entitled "Layer-Layer Lithium Rich Complex Metal Oxides With High Specific Capacity and Excellent Cycling," incorporated herein by reference.

The formulas presented herein for the positive electrode active materials are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

A co-precipitation process has been performed for the desired lithium rich metal oxide materials described herein having nickel, cobalt, manganese and additional optional metal cations in the composition and exhibiting the high specific capacity performance. In addition to the high specific capacity, the materials can exhibit a good tap density which leads to high overall capacity of the material in fixed volume applications. Specifically, lithium rich metal oxide compositions formed by the co-precipitation process were used in coated forms to generate the results in the Examples below.

Specifically, the synthesis methods based on co-precipitation have been adapted for the synthesis of compositions with the formula $Li_{1+b}Ni_{\alpha}Mn_{\beta}Co_{\gamma}A_{\delta}O_{2-z}F_z$, as described above. In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed at a second higher temperature to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, $LiOH$, $Li_2CO_3$, or a combination thereof, can be mixed with the precipitated metal carbonate or metal hydroxide. The powder mixture is then advanced through the heating step(s) to form the oxide and then the crystalline final product material.

Further details of the hydroxide co-precipitation process are described in published U.S. patent Application 2010/0086853A to Venkatachalam et al. entitled "Positive Electrode Material for Lithium Ion Batteries Having a High Specific Discharge Capacity and Processes for the Synthesis of these Materials", incorporated herein by reference. Further details of the carbonate co-precipitation process are described in published U.S. patent application 2010/0151332A to Lopez et al. entitled "Positive Electrode Materials for High Discharge Capacity Lithium Ion Batteries," incorporated herein by reference.

Also, it has been found that coating the positive electrode active materials can improve the cycling of lithium-based batteries. The coating can also be effective at reducing the irreversible capacity loss of the battery as well as increasing the specific capacity generally. The amount of coating material can be selected to accentuate the observed performance improvements. Suitable coating materials, which are generally believed to be electrochemically inert during battery cycling, can comprise metal fluorides, metal oxides, metal non-fluoride halides or metal phosphates. The results in the Examples below are obtained with materials coated with metal fluorides.

For example, the general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference. Improved metal fluoride coatings with appropriately engineered thicknesses are described in copending U.S. patent application Ser. No. 12/616,226, now published U.S. patent application Ser. No. 2011/0111298 A1 to Lopez et al, (the '226 application) entitled "Coated Positive Electrode Materials for Lithium Ion Batteries," incorporated herein by reference. Suitable metal oxide coatings are described further, for example, in copending U.S. patent application Ser. No. 12/870,096, now U.S. Pat. No. 8,535,832 B2 to Karthikeyan et al. entitled "Metal Oxide Coated Positive Electrode Materials for Lithium-Based Batteries", incorporated herein by reference. The discovery of non-fluoride metal halides as desirable coatings for cathode active materials is described in copending U.S. patent application Ser. No. 12/888,131, now U.S. Pat. No. 8,663,849 B2 to Venkatachalam et al., entitled "Metal Halide Coatings on Lithium Ion Battery Positive Electrode Materials and Corresponding Batteries," incorporated herein by reference. In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure.

A metal fluoride coating can be deposited using a solution based precipitation approach. A soluble composition of the desired metal can be dissolved in a suitable solvent, such as an aqueous solvent. Then, $NH_4F$ can be gradually added to the dispersion/solution to precipitate the metal fluoride. The total amount of coating reactants can be selected to form the desired thickness of coating, and the ratio of coating reactants can be based on the stoichiometry of the coating material. After removing the coated electroactive material from the solution, the material can be dried and heated, generally above about 250° C., to complete the formation of the coated material. The heating can be performed under a nitrogen atmosphere or other substantially oxygen free atmosphere.

An oxide coating is generally formed through the deposition of a precursor coating onto the powder of active material. The precursor coating is then heated to form the metal oxide coating. Suitable precursor coating can comprise corresponding metal hydroxides, metal carbonates or metal nitrates. The metal hydroxides and metal carbonate precursor coating can be deposited through a precipitation process since the addition of ammonium hydroxide and/or ammonium carbonate can be used to precipitate the corresponding precursor coatings. The precursor coating can be heated, generally above about 250° C., to decompose the precursor to form the oxide coating.

Negative Electrode Active Materials

Desirable high capacity negative electrode active materials can be based on nanostructured silicon materials and/or composites with nanostructured carbon materials. In particular, nanostructured silicon can comprise elemental silicon nanoparticles and/or porous elemental silicon, as well as corresponding silicon alloys and composites thereof. Silicon can form alloys with various materials that can have high capacities with respect to forming further alloys with lithium, and the silicon alloys provide an alternative to silicon with respect to evaluation of high capacity silicon-based materials that can provide appropriate cycling. Nanostructured materials can provide high surface areas and/or high void volume relative to bulk silicon. By adapting to volume changes of the material, it is believed that nanostructured silicon can provide at least some accommodation for volume expansion and reduced stress on the material during silicon-lithium alloying. Furthermore, the adaptability of nanostructured silicon can result in a corresponding decrease in irreversible structural changes in the material upon cycling such that the performance of the negative electrode degrades more slowly upon cycling, and a battery formed with the negative electrode can have satisfactory performance over a larger number of battery cycles. The formation of composites of silicon or silicon alloys with nanostructured carbon can provide a support for a composite nanostructure that can also mechanically stabilize the structure for improved cycling.

Also, carbon coatings can be applied over the silicon-based materials to improve electrical conductivity, and the carbon coatings seem to also stabilize the silicon based material with respect to improving cycling and decreasing irreversible capacity loss. In embodiments of particular interest, an organic composition dissolved in a suitable solvent can be mixed with the active composition and dried to coat the active composition with the carbon coating precursor. The precursor coated composition can then by pyrolyzed in an oxygen free atmosphere to convert the organic precursor into a carbon coating, such as a hard carbon coating. The carbon coated compositions have been found to improve the performance of the negative electrode active material.

In some embodiments, the negative electrode active material comprises a composite of a carbon material and a silicon-based material. The silicon material, the carbon material or both can be nanostructured, and the nanostructured components can then be combined to form a composite of the silicon component and the carbon component. For example, the components of the composite can be milled together to form the composite, in which the constituent materials are intimately associated, but generally not alloyed. The nanostructures characteristics are generally expected to manifest themselves in the composite, although characterization of the composites may be less established relative to the characterization of the component materials. Specifically, the composite material may have dimensions, porosity or other high surface area characteristics that are manifestations of the nano-scale of the initial materials. In some embodiments, the negative electrode active material can comprise a silicon-based material coated onto a carbon nanofibers and/or carbon nanoparticles.

In some embodiments, the silicon-based negative electrode active material can comprise a silicon-metal composite, such as an intermetallic material and/or an alloy. Alloys are homogeneous mixtures or solid solutions of metal elements, optionally with some amounts of non-metal atoms dissolved into the metal. Intermetallic materials are solid phases with two or more metal/metalloid elements, optionally with non-metal elements, with a structure different from the crystal of the constituent material. Silicon-metal intermetallic/alloys can be formed from a variety elemental metals that may or may not alloy with lithium. Furthermore, silicon-metal intermetallic alloy compositions can be selected so that inactive metal elements within the intermetallic alloy that do not alloy with lithium contribute to the electrical conductivity of the negative electrode active material, reducing the impedance of cells formed therefrom. Silicon-based intermetallic alloys are described generally in published U.S. patent application 2009/0305131 A to Kumar et al. (hereinafter the '131 application), entitled "High Energy Lithium Ion Batteries With Particular Negative Electrode Compositions," incorporated herein by reference.

Furthermore, the negative electrode active material can comprise a carbon coated silicon-based material, which can be a silicon-carbon composite, a silicon intermetallic/alloy or combinations thereof. Without being limited by a theory, it is believed that carbon coatings and/or carbon nanofibers-nanoparticles can provide structural stability to the expanding silicon-based materials during silicon-lithium alloying. In particular, it is believed that the carbon coating and/or carbon nanofibers-particles can act as a buffer layer thereby reducing the stress on the silicon-based material during volume expansion. Desirable battery performance has been observed with carbon coated silicon-based materials.

Based on the combination of improved parameters described herein, the silicon-based active materials can be introduced to form improved electrode structures. In particular, the selection of desirable electrically conductive components can provide for improved electrode design and the desirable polymer binders can provide desired mechanical properties suitable for the electrode design in view of significant active material changes during cycling. Based on these combined features, silicon based electrodes can be formed with densities of active silicon-based materials with at least reasonable performance of at least about 0.6 g/cm$^3$, in further embodiments at least about 0.7 g/cm$^3$ and in further embodiments at least about 0.0.75 g/cm$^3$. Similarly, the silicon based electrodes can have an average dried thickness of at least about 25 microns, in further embodiments at least about 30 microns and in additional embodiments at least about 50 microns, which can correspond to active material loadings of at least about 2 mg/cm$^2$. The resulting silicon based electrodes can exhibit capacities per unit area of at least about 3.5 mAh/cm$^2$, in further embodiments at least about 4.5 mAh/cm$^2$ and in additional embodiments at least about 5 mAh/cm$^2$. A person of ordinary skill in the art will recognize that additional ranges of negative electrode parameters within the explicit ranges above are contemplated and are within the present disclosure.

Nanoparticle Silicon

As noted above, suitable nanostructured silicon can comprise nanoparticulate silicon. Negative electrode active material can desirably comprise silicon nanoparticles either alone or in a composite. Silicon nanoparticles can provide a high surface area material that can desirably adapt to volume changes in the material during silicon-lithium alloying. In general, nanoparticle silicon can comprise amorphous and/or crystalline silicon nanoparticles. Crystalline silicon nanoparticles can be desireable in some embodiments because of their larger electrical conductivity, relative to amorphous silicon nanoparticles. Furthermore, for nanoparticle silicon materials of interest herein, silicon nanoparticles can be non-doped or doped. Doped nanoparticles can be desirable due to increased electrical conductivity relative to non-doped silicon nanoparticles. With respect to doped nanoparticle compositions, p-doping can be achieved through the inclusion of dopants, such as boron or aluminum, within the silicon nanoparticles. N-doping can be achieved, for example, by inclusion of known n-dopant elements, such as phosphorous, arsenic, or antimony, in the silicon nanoparticles. The dopant concentration of silicon nanoparticles can be from about $1 \times 10^{14}$ cm$^{-3}$ to about $1 \times 10^{20}$ cm$^{-3}$.

As used herein, nanoparticle silicon can comprise submicron particles with an average primary particle diameter of no more than about 500 nm, in further embodiments no more than about 250 nm, and in additional embodiments no more than about 200 nm. A particle diameter refers to the average diameters along principle axes of a particle. Primary particle dimensions refer to the dimensions of the particulates visible in a transmission electron micrograph, and the primary particles may or may not exhibit some degree of agglomeration and/or fusing. The primary particle size generally reflects the surface area of the particle collection, which is a significant parameter for performance as a battery active material. The BET surface area can range from about 1 m$^2$/g to about 700 m$^2$/g, and in further embodiments form about 5 m$^2$/g to about 500 m$^2$/g. BET surface areas can be evaluated, for example, using commercially available instruments. A person of ordinary skill in the art will recognize that additional ranges of particle size and surface areas within the explicit ranges above are contemplated and are within the present disclosure.

Suitable silicon nanoparticles can be obtained commercially from Sigma Aldrich or Nanostructured or Amorphous Materials, Inc. Also, laser pyrolysis can be used for the production of non-doped and doped crystalline silicon nanoparticles. A description of the synthesis of silicon nanoparticles with selected compositions and a narrow distribution of primary particles sizes using laser pyrolysis is described in U.S. patent application publication no. 2008/0160265 to Hieslmair et al., entitled "Silicon/Germanium Particle Inks, Doped Particles, Printing And Processes for Semiconductor Applications," incorporated herein by reference. Silicon nanowires have been proposed as a desirable negative electrode active material as described in U.S. Pat. No. 7,816,031 to Cui et al., entitled "Nanowire Battery Methods and Arrangements," incorporated herein by reference.

Porous Silicon

Another suitable form of nanostructured silicon comprises porous silicon particles with nanostructured pores, and negative electrode active material can desirably comprise porous silicon and/or composites thereof. Porous silicon can have improved cycling behavior due to its high surface area and/or void volume, which can facilitate accommodation of volume changes with lithium alloying and de-alloying. For materials of interest herein, porous silicon can be non-doped or doped. In some embodiments, doped porous silicon can be desirable because of its larger electrical conductivity relative to non-doped porous silicon.

The porous particles can have average diameters in some embodiments of no more than about 5 microns, in further embodiments no more than about 1 microns and in additional embodiments from about 100 nanometers to about 5 nanometers. Porosity can be expressed in terms of BET surface areas since the pores directly increase the effective and measured surface area of the particles. In some embodiments, the BET surface area can be at least 1 m$^2$/g, in further embodiments at least 5 m$^2$/g and in additional embodiments 10 m$^2$/g to about 300 m$^2$/g. A person of ordinary skill in the art will recognize that additional ranges of average particle diameter and BET surface area are contemplated and are within the present disclosure.

In some embodiments, doped and non-doped porous silicon can be formed on bulk silicon by electrochemical etching of silicon wafers. Silicon wafers are available commercially for use in semiconductor applications and other electronics applications. Electrochemical etching can comprise etching a silicon wafer in an electrochemical cell. The electrochemical cell can be assembled with a negative electrode formed from a silicon wafer and assembled across a positive electrode in an electrolyte-etching solution. A selected current density is then applied across the electrodes and the resulting current induced in the electrochemical cell etches the silicon, with predominant etching being at the regions of the silicon wafer that are closest to the positive electrode. The positive electrode can generally comprise an elemental metal such as platinum or other metal, and the electrolyte solution can generally comprises a mixture of hydrofluoric acid (HF), water ($H_2O$), and ethanol ($C_2H_5OH$). Other reasonable alcohols can be substituted for the ethanol. Generally, the etching solution can comprise alcohol in a concentration from about 25 weight percent to about 80 weight percent. Furthermore, suitable etching solutions can comprise from about 5 to about 50 weight percent HF. A person of ordinary skill in the art will recognize that additional concentration ranges within the explicit ranges above are contemplated and are within the present disclosure. Where n-doped or p-doped porous silicon is desired, the negative electrode is formed from a n-doped or p-doped silicon wafer, respectively.

In electrochemical etching, both the porosity and the pore size of the resulting porous silicon wafer can be controlled by the type, doping level, and crystalline orientation of the starting wafer, as well as, of the silicon wafer, the current density, the electrolyte solution concentration, and etching time. Generally, porosity can be increased by increasing the current density, and/or decreasing the HF concentration in the electrolyte solution. For the porous silicon materials of interest herein, the current density can be, for example, no more than about 500 mA/cm$^2$ and in further embodiments from about 300 mA/cm$^2$ to about 1 mA/cm$^2$. Desirable etching times are from about 5 mins to about 10 hour and in further embodiments from about 10 mins to about 5 hours. If desired, the silicon substrate can be irradiated to increase electrical conductivity, which in turn is expected to increase the etching rate. Irradiation can be particularly desirable for n-type crystalline silicon to induce the formation of holes that are believed to facilitate etching. Suitable light sources include, for example, tungsten filament lamps, halogen lamps or other bright white light source. To complete the process, the current density can be increased significantly for a short period of time to detach the etched silicon from the substrate surface, and the harvested detached silicon can be milled into particles of porous silicon. The current density for delamination can be close the critical density at which the electropolishing process becomes dominant. Depending on the HF concentration, the current density to detach the etched silicon can be from about 150 mA/cm$^2$ to about 800 mA/cm$^2$.

Porous silicon particles can be formed from etched wafers, such as wafers treated with the electrochemical etching method as just described. After initial etching to create a porous silicon layer on bulk silicon with the desired average pore size and porosity, the porous silicon layer can be released from the bulk silicon by increasing etching current density and further agitated to form porous silicon nanoparticles. Alternatively, non-doped and doped porous silicon nanoparticles can be formed from bulk silicon by stain etching. In stain etching, the silicon wafer or the like is immersed in an aqueous solution comprising HF and nitric acid. Generally, stain etching results in reduced homogeneity and reproducibility relative to anodically formed porous silicon as described above. A description of the synthesis of porous silicon nanoparticles with selected composition by stain etching is described in U.S. Pat. No. 7,514,369 to Li et al., entitled "Method of Producing Silicon Nanoparticles from Stain-Etching and Silicon Nanoparticles From Stain-Etched Silicon Powder," incorporated herein by reference.

Silicon-Metal Intermetallic Materials and/or Alloys

In some embodiments, the negative electrode active composition can comprise a silicon-metal alloy and/or intermetallic material. Suitable silicon-metal intermetallic alloys are described in published U.S. patent application 2009/0305131A to Kumar et al., entitled "High Energy Lithium Ion Batteries With Particular Negative electrode Compositions," incorporated herein by reference. The alloy/intermetallic materials can be represented by the formula $Si_xSn_qM_yC_z$ where $(q+x)>2y+Z$, $q\geq0$, $z\geq0$, and M is metal selected from manganese, molybdenum, niobium, tungsten, tantalum, iron, copper, titanium, vanadium, chromium, nickel, cobalt, zirconium, yttrium, and combinations thereof. See also, published U.S. patent application 2007/0148544A to Le, entitled "Silicon-Containing Alloys Useful as Electrodes for Lithium-Ion Batteries," incorporated herein by reference. In the materials described herein, generally the carbon materials and processing conditions are selected such that the carbon does not form a composition with the silicon. In the alloys described in the examples, $z=0$ and $q=0$, so that the formula simplifies to $Si_xM_y$, where $x>2y$. Examples are presented for M=Fe or Cu. The alloys can be formed by appropriate milling.

Nano-Scale Carbon Fibers and Particles

Carbon nanofibers and/or carbon nanoparticles provide for good electrical conductivity and can provide a support structure for nano-structured silicon such that the stress of alloy formation with lithium can be reduced. Carbon nanofibers can be obtained or can be synthesized using a vapor organic composition and a catalyst in a suitable thermal reaction. One approach for the synthesis of carbon nanofibers are described in published U.S. patent application 2009/0053608 to Choi et al., entitled "Anode Active Material Hybridizing Carbon Nanofiber for Lithium Secondary Battery," incorporated herein by reference. Carbon fibers are available commercially from a variety of suppliers. Suitable suppliers are summarized in the following Table, which is in two parts.

| Fiber | Company | Product ID | Length (μm) | Diameter (nm) |
|---|---|---|---|---|
| 1 | Showa Denko | VGCF-H | 10-20 | 150 |
| 2 | Nano-vision tech | GNF-100 | ~30 | ~200 |
| 3 | | GNF-L | ~30 | ~300 |
| 4 | Nanostructured & amorphous materials Inc. | GNF | 10-40 | 200-500 OD & 1-10 core |
| 5 | Zoltek | PANEX 30 | 150-200 | 7400 |
| 6 | | PANEX 32 | 100-200 | ~7200 |
| 7 | E&L enterprises | PC100 | 80-100 | 7000 |
| 8 | Kureha | KCF100 | 130-1000 | 15000 |
| 9 | | KGF200 | 100-1000 | 14500 |
| 10 | Cytek carbon Inc | Cytek | 10 | |
| 11 | Pyrograph products Inc. | PR19-XT-HHT | | 150 |
| 12 | | PR25-XT-HHT | | 100 |
| 13 | SGL group carbon | SIGRAFIL | | 8000 |

| Fiber | Powder resistivity (W-cm) | Specific surface area (m$^2$/g) | Bulk density (g/cm$^3$) | True density (g/cm$^3$) | Purity |
|---|---|---|---|---|---|
| 1 | 0.01-0.015 at 0.8 g/cm$^3$ | 13 | 0.04 | 2 | 0.1% ash |
| 2 | | 100-300 | 0.15-0.18 | | >90% |
| 3 | | 100 | 0.12-0.15 | | >90% |
| 4 | ~0.06 at 0.8 g/cm$^3$ | <25 | 0.15-0.25 | 1.9 | ~99.8% & 0.2% Fe |
| 5 | 0.0014 | | 0.44 | 1.75 | 99% |
| 6 | 0.0015 | | 0.44 | 1.81 | >95% |
| 7 | | | 0.3 | | >92% |
| 8 | 0.15 | | | 1.63 | >95% |
| 9 | 0.5 | | | 1.6 | >99% |
| 10 | 0.012 | | | 1.9 | |
| 11 | | 15-25 | | | Fe <100 ppm |
| 12 | | ~40 | | | Fe <100 ppm |
| 13 | | | | 1.75 | >95% |

In general, suitable carbon nanofibers can have average diameters of about 25 nm to about 250 nm and in further embodiments, from about 30 nm to about 200 nm, and with average lengths from about 2 microns to about 25 microns, and in further embodiments from about 4 microns to about 20 microns. A person of ordinary skill in the art will recognize that additional ranges of nanofiber average diameters and lengths within the explicit ranges above are contemplated and are within the present disclosure.

Similarly, pyrolytic carbon particles, e.g., carbon blacks, can be used as a support in appropriate composites. Carbon black can have average particle sizes of no more than about 250 nm, and in some embodiments no more than about 100 nm, as well as suitable subranges within these ranges. Carbon blacks are readily available from a variety of suppliers, such as Cabot Corporation and Timcal, Ltd, Switzerland (acetylene black, Super P™).

Composites of Carbon and Nano-Structured Silicon

It can be desirable to form composites of nano-scale carbon particles and/or fibers with silicon, such as nanostructures silicon. To form the composites, the constituent materials are obtained and/or prepared and combined to introduce strong mechanical interactions between the material components. The composite may comprise, for example, silicon coated onto the nano-carbon component, carbon components embedded within pores of porous silicon particles or other interactions or combination of interactions. In general, the types of interactions between the constituents of the composites do not need to be well characterized. The composites though are found to exhibit desirable battery performance in a lithium ion battery. In general, the composite can comprise at least about 5 weight percent silicon/silicon alloy, in further embodiments, from about 7.5 weight percent to about 95 weight percent and in additional embodiments from about 10 weight percent to about 90 weight percent silicon/silicon alloy, e.g., nano-structured silicon. A person of ordinary skill in the art will recognize that additional ranges of silicon/silicon alloy composition within the explicit ranges above are contemplated and are within the present disclosure.

In some embodiments, nanostructured silicon composites can be formed by milling nanostructured silicon with carbon fibers and/or carbon nanoparticles. The milling process can comprise, for example, jar milling and/or ball milling, such as planetary ball milling. Ball milling and similarly jar milling involves grinding using a grinding medium, which can then be substantially removed from the ground material. A planetary ball mill is a type of ball milling in which the mill comprises a sun-wheel, at least one grinding jar mounted eccentrically on the sun-wheel, and a plurality of mixing balls within the grinding jar. In operation, the grinding jar rotates about its own axis and in the opposite direction around the common axis of the sun-wheel.

Desirable ball milling rotation rates and ball milling times can be selected based on the desired nanostructured silicon composite composition and structure. For the formation of silicon/silicon alloy composites described herein, ball milling rotation rates can be from about 25 rpm to about 1000 rpm and in further embodiments from about 50 rpm to about 800 rpm. Furthermore, desirable ball milling times can be from about 10 minutes to about 20 hour and in further embodiments from about 20 minutes to about 10 hours. A person of ordinary skill in the art will recognize that additional ranges of milling rates and times within the explicit ranges above are contemplated and are within the present disclosure. The mill container can be filled with an inert gas to avoid oxidizing the contents of the container during milling Examples of suitable grinding media include, for example, particles of zirconia, alumina, tungsten carbide or the like.

Pyrolytic Carbon Coatings

Carbon coatings can be applied to nanostructured silicon or silicon composites to increase electrical conductivity and/or to provide structural support to the resulting materials. The carbon coatings can be formed from pyrolyzed organic compositions under oxygen free atmospheres. Hard carbon coatings are generally formed at relatively high temperatures. The properties of the coatings can be controlled based on the processing conditions. In particular, carbon coatings can have a high hardness and generally can comprise significant amorphous regions possible along with graphitic domains and diamond structured domains.

Carbon coatings formed from coal tar pitch is described in published PCT patent application WO 2005/011030 to Lee et al., entitled A Negative Active Material for Lithium Secondary Battery and a Method for Preparing Same," incorporated herein by reference. In contrast, as described herein, an organic composition is dissolved in a suitable solvent and mixed with the active material. The solvent is removed through drying to form a solid precursor coated active material. This approach with a solvent for delivering a solid pyrolytic carbon precursor can facilitate formation of a more homogenous and uniform carbon coating. Then, the precursor coated material is heated in an effectively oxygen free environment to form the pyrolytic carbon coating. The heating is generally performed at a temperature of at least about 500° C., and in further embodiments at least about 700° C. and in other embodiments, from about 750° C. to about 1350° C. Generally, if temperatures are used above about 800° C., a hard carbon coating is formed. The heating can be continued for a sufficient period of time to complete the formation of the hard carbon coating. Desirable precursors can comprise organic compositions that are solids or liquids at room temperature and have from two carbon atoms to 20 carbon atoms, and in further embodiments from 3 carbon atoms to 15 carbon atoms as well as other ranges of carbon atoms within these ranges, and generally these molecules can comprise other atoms, such as oxygen, nitrogen, sulfur, and other reasonable elements. Specifically, suitable compounds include, for example, sugars, other solid alcohols, such as furfuryl alcohol, solid carboxylic acids, such as citric acid, polymers, such as polyacrylonitrile, and the like. The carbon coating generally comprises hard amorphous carbon, although some degree of graphite and/or diamond-like domains may be present. The coated materials generally comprise no more than about 50 weight percent pyrolytic carbon, in further embodiments no more than about 40 weight percent, and in additional embodiments, from about 1 weight percent to about 30 weight percent. A person of ordinary skill in the art will recognize that additional ranges within the explicit ranges above of amounts of coating composition are contemplated and are within the present disclosure.

Metal Coatings

As an alternative to carbon coatings, elemental metal can be coated onto the silicon, silicon alloy or silicon composite. Suitable elemental metals include metals that can be reduced under reasonable conditions to form an inert metal in the battery. In particular, silver and copper can be reduced to deposit the metal coating. The elemental metal coating can be expected to increase electrical conductivity and to stabilize the silicon-based material during the lithium alloying and de-alloying process. In general, the coated material can comprise no more than about 25 weight percent metal coating and in further embodiments from about 1 weight percent to about 20 weight percent metal coating. A person of ordinary skill in the art will recognize that additional ranges of metal coating composition within the explicit ranges above are contemplated and are within the present disclosure. A solution based approach can be used to apply the metal coating. For example, the silicon-based material to be coated can be mixed with a solution comprising dissolved salt of the metal, such as silver nitrate, silver chloride, copper nitrate, copper chloride or the like, and a reducing agent can be added to deposit the metal coating. Suitable reducing agents include, for example, sodium hypophosphite, sodium borohydride, hydrazine, formaldehyde and the like.

Supplemental Lithium

Various approaches can be used for the introduction of supplemental lithium into the battery, although following corresponding initial reactions and/or charging, the negative electrode becomes charged with excess lithium for cycling from the supplemental lithium. With respect to the negative electrode in batteries having supplemental lithium, the structure and/or composition of the negative electrode can change relative to its initial structure and composition following the first cycle as well as following additional cycling. Depending on the approach for the introduction of the supplemental lithium, the positive electrode may initially include a source of supplemental lithium and/or a sacrificial electrode can be introduced comprising supplemental lithium.

With respect to initial structure of the negative electrode, in some embodiments, the negative electrode has no changes due to the supplemental lithium. In particular, if the supplemental lithium is initially located in the positive electrode or a separate electrode, the negative electrode can be an unaltered form with no lithium present until the battery is charged or at least until the circuit is closed between the negative electrode and the electrode with the supplemental lithium in the presence of electrolyte and a separator. For example, the positive electrode or supplemental electrode can comprise elemental lithium, lithium alloy and/or other sacrificial lithium source.

If sacrificial lithium is included in the positive electrode, the lithium from the sacrificial lithium source is loaded into the negative electrode during the charge reaction. The voltage during the charging based on the sacrificial lithium source may be significantly different than the voltage when the charging is performed based on the positive electrode active material. For example, elemental lithium in the positive electrode can charge the negative electrode active material without application of a external voltage since oxidation of the elemental lithium drives the reaction. For some sacrificial lithium source materials, an external voltage is applied to oxidize the sacrificial lithium source in the positive electrode and drive lithium into the negative electrode active material. The charging generally can be performed using a constant current, a stepwise constant voltage charge or other convenient charging scheme. However, at the end of the charging process, the battery should be charged to a desired voltage, such as 4.5V.

In further embodiments, at least a portion of the supplemental lithium is initially associated with the negative electrode. For example, the supplemental lithium can be in the form of elemental lithium, a lithium alloy or other lithium source that is more electronegative than the negative electrode active material. After the negative electrode is in contact with electrolyte, a reaction can take place, and the supplemental lithium is transferred to the negative electrode active material. During this process, the SEI layer is also formed. Thus, the supplemental lithium is loaded into the negative electrode active material with at least a portion consumed in formation of the SEI layer. The excess lithium released from the lithium rich positive electrode active material is also deposited into the negative electrode active material during eventual charging of the battery. The supplemental lithium placed into the negative electrode should be more electronegative than the active material in the negative electrode since there is no way of reacting the supplemental lithium source with the active material in the same electrode through the application of a voltage.

In some embodiments, supplemental lithium associated with the negative electrode can be incorporated as a powder within the negative electrode. Specifically, the negative electrode can comprise an active negative electrode composition and a supplemental lithium source within a polymer binder matrix, and any electrically conductive powder if present. In additional or alternative embodiments, the supplemental lithium is placed along the surface of the electrode. For example, the negative electrode can comprise an active layer with an active negative electrode composition and a supplemental lithium source layer on the surface of active layer. The supplemental lithium source layer can comprise a foil sheet of lithium or lithium alloy, supplemental lithium powder within a polymer binder and/or particles of supplemental lithium source material embedded on the surface of active layer. In an alternative configuration, a supplemental lithium source layer is between the active layer and current collector. Also, in some embodiments, the negative electrode can comprise supplemental lithium source layers on both surfaces of the active layer.

In additional embodiments, at least a portion of the supplemental lithium can be supplied to the negative electrode active material prior to assembly of the battery. In other words, the negative electrode can comprise partially lithium-loaded silicon-based active material, in which the partially loaded active material has a selected degree of loading of lithium through intercalation/alloying or the like. For example, for the preloading of the negative electrode active material, the negative electrode active material can be contacted with electrolyte and a lithium source, such as elemental lithium, lithium alloy or other sacrificial lithium source that is more electronegative than the negative electrode active material. An experimental arrangement to perform such a preloading of lithium can comprise an electrode with silicon-based active material formed on a current collector, which are placed in vessel containing electrolyte and a sheet of lithium source material contacting the electrode. The sheet of lithium source material can comprise lithium foil, lithium alloy foil or a lithium source material in a polymer binder optionally along with an electrically conductive powder, which is in direct contact with the negative electrode to be preloaded with lithium such that electrons can flow between the materials to maintain electrical neutrality while the respective reactions take place. In the ensuing reaction, lithium is loaded into the silicon-based active material through intercalation, alloying or the like. In alternative or additional embodiments, the negative electrode active material can be mixed in the electrolyte and the lithium source material for incorporation of the supplemental lithium prior to formation into an electrode with a polymer binder so that the respective materials can react in the electrolyte spontaneously.

In some embodiments, the lithium source within an electrode can be assembled into a cell with the electrode to be preloaded with lithium. A separator can be placed between the respective electrodes. Current can be allowed to flow between the electrodes. Depending on the composition of the lithium source it may or may not be necessary to apply a voltage to drive the lithium deposition within the silicon-based active material. An apparatus to perform this lithiation process can comprise a container holding electrolyte and a cell, which comprises an electrode, to be used as a negative electrode in an ultimate battery, a current collector, a separator and a sacrificial electrode that comprises the lithium source, where the separator is between the sacrificial electrode and the electrode with the silicon-based active material. A convenient sacrificial electrode can comprise lithium foil, lithium powder embedded in a polymer or lithium alloys, although any electrode with extractable lithium can be used. The container for the lithiation cell can comprise a conventional battery housing, a beaker, or any other convenient structure. This configuration provides the advantage of being able to measure the current flow to meter the degree of lithiation of the negative electrode. Furthermore, the negative electrode can be cycled once or more than once in which the negative electrode active material is loaded close to full loading with lithium. In this way, the SEI layer can be formed with a desired degree of control during the preloading with lithium of the negative electrode active material. In this way, the negative electrode is fully formed during the preparation of the negative electrode with a selected preloading with lithium.

In general, the lithium source can comprise, for example, elemental lithium, a lithium alloy or a lithium composition, such as a lithium metal oxide, that can release lithium from the composition. Elemental lithium can be in the form of a foil and/or a powder. Elemental lithium, especially in powder form, can be coated to stabilize the lithium for handling purposes, and commercial lithium powders, such as powders from FMC Corporation, are sold with proprietary coatings for stability. The coatings generally do not alter the performance of the lithium powders for electrochemical applications. Lithium alloys include, for example, lithium silicon alloys and the like. Lithium composition with intercalated lithium can be used in some embodiments, and suitable compositions include, for example, lithium titanium oxide, lithium tin oxide, lithium cobalt oxide, lithium manganese oxide, and the like.

In general, the amount of supplemental lithium preloaded or available to load into the active composition can be in an amount of at least about 2.5% of capacity, in further embodiments from about 3 percent to about 90 percent of capacity and in additional embodiments from about 5 percent to about 80 percent of the negative electrode active material capacity. Another parameter of interest related to the total balance of the negative electrode active material against the total available active lithium, which is the sum of the supplemental lithium and the positive electrode theoretical capacity. In some embodiments, the total available active lithium can be no more than about 110 percent of the negative electrode capacity, in further embodiments, no more than 105 percent and in further embodiments, from about 65 percent to about 100 percent and in further embodiments from about 70 to about 97.5 percent of the negative electrode active capacity. In some traditional batteries, the negative electrode is balanced at 107% of positive electrode capacity, which corresponds with 93.5% active lithium relative to the negative electrode capacity. While values of active lithium greater than 100% of the negative electrode capacity can result in plating of lithium in the negative electrode, data obtained with graphitic carbon negative electrode active materials indicated that lithium is consumed with cycling. Since similar results can be expected with silicon-based active materials, a modest amount of initial lithium that may plate in the negative electrode may be consumed prior to dendrite formation. A person of ordinary skill in the art will recognize that additional ranges of lithium preloading within the explicit ranges above are contemplated and are within the present disclosure.

Battery Performance

Batteries formed from lithium rich positive electrode active materials and supplemental lithium have demonstrated promising performance under realistic discharge conditions. Specifically, the silicon-based active materials have demonstrated a high specific capacity upon cycling of the batteries at moderate discharge rates and with realistic cathodes with cycling over a voltage range with a high voltage cutoff. In particular, desirable specific capacities can be obtained based on both the masses of the positive electrode active material and the negative electrode active material such that the results correspond with a high overall capacity of the batteries. Composites described herein can exhibit reasonable irreversible capacity losses, and in some embodiments supplemental lithium can be successfully used to reduce the irreversible capacity loss. Relatively stable cycling at high specific capacities can be obtained for a modest number of cycles against a positive electrode with lithium rich high capacity lithium metal oxides.

In general, various similar testing procedures can be used to evaluate the capacity performance of the battery. The silicon-based electrodes can be tested against a lithium foil electrode to evaluate the capacity and the IRCL. However, more meaningful testing can be performed with a realistic positive electrode since then the battery is cycled over appropriate voltage ranges for cycling in a useful battery. Suitable testing procedures are described in more detail in the examples below. Specifically, batteries assembled with a lithium foil electrode are cycled with the silicon-based electrode functioning as a positive electrode (cathode) and the lithium foil functions as the negative electrode (anode). The batteries with a lithium foil electrode can be cycled over a voltage range, for example, from 0.005V to 1.5 V at room temperature. Alternatively, batteries can be formed with a positive electrode comprising a layered-layered lithium rich metal oxide in which the silicon-based electrode is then the negative electrode, and the battery can then be cycled between 4.5 volts and 2 volts at room temperature. For the batteries with a lithium metal oxide-based positive electrode, the first cycle can be charged and discharged at a rate of C/10 and subsequent cycling can be at a rate of C/3 unless specified otherwise with charging at C/3. The specific discharge capacity is very dependent on the discharge rate. The notation C/x implies that the battery is discharged at a rate to fully discharge the battery to the selected voltage minimum in x hours.

As noted above, the irreversible capacity loss is the difference between the first charge specific capacity and the first discharge specific capacity. With respect to the values described herein, the irreversible capacity loss can be at more desirable values, and the addition of supplemental lithium can further reduce the values. In some embodiments, the irreversible capacity loss is no more than about 20% of the first cycle charge capacity, in further embodiments no more than about 19%, and in other embodiments no more than about 18% of the first cycle charge capacity. The relatively low irreversible capacity losses can be combined with relatively high specific capacities. In some embodiments, a battery comprising a lithium rich metal oxide and a silicon-based active material, can exhibit an irreversible capacity loss of no more than about 20% and a 10th cycle negative electrode specific capacity at a rate of C/3 of at least about 900 mAh/g, in further embodiments at least about 1000 mAh/g and in additional embodiments from about 1050 mAh/g to about 1900 mAh/g when cycled from 4.5V to 1V. A person of ordinary skill in the art will recognize that additional ranges of irreversible capacity loss and specific capacity are contemplated and are within the present disclosure.

The specific capacity of the silicon-based electrode can be evaluated in configurations with either a lithium-foil counter-electrode or with a lithium metal oxide based counter electrode. For the batteries formed with a lithium metal oxide based positive electrode, the specific capacity of the battery can be evaluated against the weights of both anode and cathode active materials. Using a high capacity positive electrode active material, the overall benefits of using a high capacity silicon-based negative electrode active material becomes even more beneficial. Based on the capacity of the battery, the specific capacities can be obtained by dividing by the weight of the active materials in each electrode. It can be desirable to have high specific capacities for both electrodes. The advantages of high specific capacity for each electrode with respect to the overall specific capacity of the battery is described in an article by Yoshio et al., Journal of Power Sources 146 (June 2005) pp 10-14, incorporated herein by reference. Whether or not the battery includes supplemental lithium, the two electrodes are relatively balanced so that capacity is not wasted. If the battery is not reasonably balanced, the specific capacity of one electrode correspondingly drops. The electrode balance is discussed above in the context of supplemental lithium, but the concepts of the discussion follow whether or not supplemental lithium is present.

In some embodiments, the batteries further include supplemental lithium to reduce the irreversible capacity loss and to stabilize the cycling of lithium rich metal oxides, and for these embodiments, it can be desirable for the negative electrode to have a specific capacity at the tenth cycle of at least about 500 mAh/g, in further embodiments at least about 700 mAh/g and in additional embodiments at least about 800 mAh/g at a discharge rate of C/3 when cycled between 4.5V and 1V and based on the anode active weight. Depending on the specific silicon based active material, the lower voltage cutoff can be selected to be 2V, 1.5V, 1V or 0.5V. In general, the lower voltage cutoff can be selected to extract a selected portion of the electrode capacity from about 92% to about 99%, and in further embodiments from about 95% to about 98% of the total capacity of the electrode. As noted above, it can be desirable to have a relatively high specific capacity for both electrodes when the positive electrode comprises a lithium rich metal oxide, and the battery can exhibit at a discharge rate of C/3 at the 50th cycle a positive electrode specific capacity of at least about 150 mAh/g and a negative electrode specific capacity of at least about 750 mAh/g, in further embodiments a positive electrode specific capacity of at least about 160 mAh/g and a negative electrode specific capacity of at least about 850 mAh/g, and in additional embodiments a positive electrode specific capacity of at least about 170 mAh/g and a negative electrode specific capacity of at least about 1000 mAh/g, when cycled between 4.5V and 1V. A person of ordinary skill in the art will recognize that additional ranges of specific capacity and other battery parameters within the explicit ranges above are contemplated and are within the present disclosure.

EXAMPLES

A significant variety of silicon-based materials were tested in batteries to evaluate their performance. Many of these samples comprised nanostructured silicon and some of these samples were formed into composites with carbon. Also, silicon alloys were also examined. Generally, the samples were formed into coin cells to test the performance of materials with respect to lithium alloying/intercalation. Coin cells were formed either with lithium foil as the counter electrode such that the silicon based electrode functioned as a positive electrode against the lithium foil or with a positive electrode comprising a lithium rich mixed metal oxide such that the resulting battery had a realistic formulation for cycling over a relevant voltage range for a commercial battery. The general procedure for formation of the coin cells is described in the following discussion and the individual examples below describe formulation of the silicon-based materials and the performance results from batteries formed from the silicon rich materials.

To test particular samples, electrodes were formed from the samples of silicon-based active materials. In general, a powder of silicon-based active material was mixed thoroughly with acetylene black (Super P® from Timcal, Ltd., Switzerland) to form a homogeneous powder mixture. Separately, polyimide binder was mixed with N-methyl-pyrrolidone ("NMP") (Sigma-Aldrich) and stirred overnight to form a polyimide-NMP solution. The homogenous powder mixture was then added to the polyimide-NMP solution and mixed for about 2 hours to form a homogeneous slurry. The slurry was applied onto a copper foil current collector to form a thin, wet film and the laminated current collector was dried in vacuum oven at 240° C. for about two hours to remove NMP and to cure the polymer. The laminated current collector was then pressed between rollers of a sheet mill to obtain a desired lamination thickness. The dried laminate contained at least 75 wt % silicon-based active material, at least 2 wt % polyimide, and at least 3 wt % acetylene black. The resulting electrodes were assembled with either a lithium foil counter electrode or with a counter electrode comprising a lithium metal oxide (LMO).

For a first set of batteries with the lithium foil counter electrodes, the silicon-based electrodes were placed inside an argon filled glove box for the fabrication of the coin cell batteries. Lithium foil (FMC Lithium) having thickness of roughly 125 micron was used as a negative electrode. A conventional electrolyte comprising carbonate solvents, such as ethylene carbonate, diethyl carbonate and/or dimethyl carbonate, was used. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

For a second set of batteries, the silicon-based electrodes were used as negative electrode, and the positive electrodes comprised a high capacity lithium rich composition. The resulting positive electrodes are referred to as high capacity manganese rich ("HCMR™") electrodes. LMO composite active materials were synthesized using a selected co-precipitation process. The synthesis of similar compositions by a hydroxide co-precipitation process have been described in published U.S. patent application 2010/0086853A to Venkatachalam et al. entitled "Positive Electrode Material for Lithium Ion Batteries Having a High Specific Discharge Capacity and Processes for the Synthesis of these Materials", and the synthesis of similar compositions by a carbonate co-precipitation process have been described in published U.S. patent application 2010/0151332A to Lopez et al. entitled "Positive Electrode Materials for High Discharge Capacity Lithium Ion Batteries", both of which are incorporated herein by reference. In particular, the LMO powder was synthesized that is approximately described by the formula x $Li_2MnO_3 \cdot (1-x)$ Li $Ni_uMn_vCo_wO_2$ where x=0.5 ($Li_{1.2}Ni_{0.175}Co_{0.10}Mn_{0.525}O_2$). A discussion of the design of HCMR™ compositions to achieve particular performance results are described in detail in copending U.S. patent application Ser. No. 12/869,976, now U.S. Pat. No. 8,394,534 B2 filed Aug. 27, 2010 to Lopez et al., entitled "Layer-Layer Lithium Rich Complex Metal Oxides With High Specific Capacity and Excellent Cycling," incorporated herein by reference.

Electrodes were formed from the synthesized HCMR™ powder by initially mixing it thoroughly with conducting carbon black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin, wet film and the laminated current collector was dried in vacuum oven at 110° C. for about two hours to remove NMP. The laminated current collector was then pressed between rollers of a sheet mill to obtain a desired lamination thickness. The dried electrode comprised at least about 75 weight percent active metal oxide, at least about 3 weight percent acetylene black, at least about 1 weight percent graphite, and at least about 2 weight percent polymer binder.

Some of the batteries fabricated from a silicon-based negative electrode and a HCMR™ positive electrode further comprised supplemental lithium. In particular, a desired amount of SLMP® (FMC Corp.) (stabilized lithium metal powder) powder was loaded into a vial and the vial was then capped with a mesh comprising nylon or stainless steel with a mesh size between about 40 μm to about 80 μm. SLMP® (FMC corp.) was then deposited by shaking and/or tapping the loaded vial over a formed silicon-based negative electrode. The coated silicon-based negative electrode was then compressed to ensure mechanical stability.

Batteries fabricated from a silicon-based negative electrode and a HCMR™ positive electrode were balanced to have excess negative electrode material. Specific values of the negative electrode balance are provided in the specific examples below. For batteries containing supplemental lithium, balancing was based on the ratio of the first cycle lithium extraction capacity of the silicon-based negative electrode to the theoretical capacity of the HCMR™ positive electrode. The amount of supplemental lithium was selected to approximately compensate for the irreversible capacity loss of the negative electrode. For batteries without supplemental lithium, balancing was calculated as the first cycle lithium insertion capacity of the silicon-based negative electrode to the theoretical capacity of the HCMR™ positive electrode. In particular, for a given silicon-based active composition, the insertion and extraction capacities of the silicon based composition can be evaluated with the battery having a positive electrode comprising the silicon-based active material and a lithium foil negative electrode where lithium is intercalated/alloyed to the silicon-based electrode to 5 mV and de-intercalated/de-alloyed to 1.5V at a rate of C/20.

Coin cell batteries were formed by placing the silicon-based electrode and the HCMR™ electrode inside an argon filled glove box. An electrolyte was selected to be stable at high voltages, and appropriate electrolytes are described in copending U.S. patent application Ser. No. 12/630,992, now U.S. Pat. No. 8,993,177 to Amiruddin et al., entitled "Lithium Ion Battery With High Voltage Electrolytes and Additives," incorporated herein by reference. Based on these electrodes and the high voltage electrolyte, the coin cell batteries were completed with separator and hardware as described above for the batteries with the lithium foil electrode.

Example 1

Cycling Performance: Negative Electrodes with Porous Silicon

This example demonstrates the cycling performance of coin-cell batteries fabricated from negative electrode active material comprising electrochemically produced porous silicon.

To demonstrate cycling performance, several coin cell batteries were formed as described above and varied with the composition of the silicon based electrode. With respect to the various silicon based electrodes, each electrode was formed from an active material that varied in nanostructure and/or non-active electrically conductive components. With respect to nanostructure, each silicon based electrode was formed from active material comprising either nanoporous p+ silicon or pristine p+ silicon, which was not porous. Nanoporous silicon was synthesized as described below, and the pristine p+ silicon was obtained using high energy mechanical milling of an equivalent p+ silicon wafer to form a powder that had an average particle size of about 75 microns. The nanoporous silicon was either used directly or it was formed into a composite with non-active electrically conductive components. Specifically, the composites were formed from porous silicon along with a metallic coating, a pyrolitic carbon coating, and/or carbon fibers.

Synthesis of Nanostructured Silicon

Nanoporous silicon was formed by electrochemical etching of single-crystal silicon wafers. To form the anode of the etching cell, a commercial p+ doped single-crystal silicon wafer (Wafer Net) was washed with ethanol and dried under air. The cleaned wafer was then connected to an electrical connection. The cathode of the etching cell was formed from platinum foil. An etching cell was then completed by placing the anode and cathode in a in a vessel with the electrolyte/etching solution of 35% hydrofluoric acid in ethanol and subsequently connecting the anode and cathode to an external DC power supply.

Figure 2:
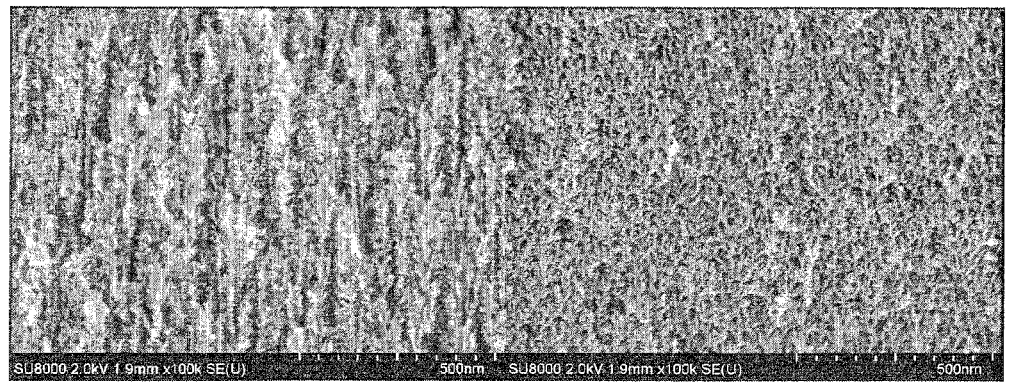
FIG. 2 is a composite of SEM images of a cross section of silicon wafers electrochemically etched at 150 mA/cm$^2$ for 20 min (left panel) and at 50 mA/cm$^2$ for 1 hour (right panel).

To induce etching of the silicon wafer, a various constant currents (12.5 mA/cm$^2$, or 25 mA/cm$^2$, or 50 mA/cm$^2$, or 150 mA/cm$^2$) were applied across the electrodes of the etching cell. Etching times varied with etching current and ranged between 20 min and 4 hours, longer etching times corresponding to smaller etching currents. After an appropriate etching time, the etched nanoporous silicon layer was released from the substrate by increasing the etching current to 200 to 500 mA/cm$^2$, which resulted in release of a portion of the etched silicon from the substrate. FIG. 2 is a composite of scanning electron microscopy ("SEM") images of the cross section of two p+ silicon wafers after electrochemical etching. The p+ silicon wafers depicted in the left and right panels of FIG. 2 were electrochemically etched at 150 mA/cm$^2$ for 20 min and at 50 mA/cm$^2$ for 1 hour, respectively. FIG. 2 reveals the nanoporous structure produced by the electrochemical etching process.

After electrochemical etching and release of the etched silicon from the silicon wafer, porous p+ nanoporous silicon particles were formed from the released nanoporous silicon by milling and then sieving the powder with a rough 20 micron cutoff.

Forming Composites with Non-Active Electrically Conducting Components

Composites were formed from the porous silicon with metal coatings. In further embodiments, the electrodes were formed with carbon fibers along with the porous silicon. For the electrodes with carbon fibers, commercial carbon fibers were obtained and combined during electrode formation with the p+ porous silicon prepared as described above. The weight ratio of porous silicon powder to carbon fibers was 0/7:0.3. The carbon fibers were combined with the porous silicon, acetylene black and binder and mixed for roughly two hours to form electrodes for batteries with lithium foil counter electrodes as described above. The battery performance results are presented below.

Also, composites of the porous silicon were formed with a carbon coating. To form the carbon coating, a slurry was prepared by mixing appropriate amounts of p+ nanoporous silicon particles, synthesized as describe above, and polyacrylonitrile (Sigma-Aldrich) in n-methyl-2-pyrrolidone ("NMP"). The mixed slurry was then dried in a vacuum oven at 110° C. The dried slurry was then heated in a furnace at 900° C. for 2 hr to 4 hr in order to carbonize the polyacrylonitrile.

Also, composites were synthesized with metal coatings, either silver or copper. For silver coatings, an appropriate amount of p+ nanoporous silicon particle powder, synthesized as describe above, was dispersed in a 6 mM silver nitrate solution for 12 hr. The pH of the solution was maintained at about 9.3 by addition of ammonium hydroxide, formaldehyde or methanol. For copper coatings, an appropriate amount of p+ nanoporous silicon particle powder, synthesized as described above, was disperse in a 84.5 mM copper chloride solution in which 0.5858 g of CuCL was dissolved in 70 mL of 5M HF solution for 1 hr. After 1 hr of electroless deposition, the solution was filtered with filter paper. For completion of the washing process, excess water was used and then a final rinse was performed with ethanol. The resulting produce was dried at 110° C. in a vacuum oven.

Performance: Effect of Nanoporosity

To evaluate the effects of nanoporous silicon electrode active materials and composites thereof on battery performance, five batteries were formed as described above with a lithium foil negative electrode and the respective silicon-based electrode compositions. A battery was formed from an electrode active composition comprising pristine, i.e., non-porous, p+ silicon ("pristine negative electrode"). Four batteries were formed from silicon based active compositions comprising nanoporous p+ silicon ("nanoporous silicon electrode"), each with differing degrees of porosity and pore sizes as produced by differing electrochemical etching conditions as described above in this example. The etching rate for each nanoporous silicon electrode active composition was either 12.5 mA/cm$^2$, or 25 mA/cm$^2$, or 50 mA/cm$^2$, or 150 mA/cm$^2$ and etching times were correspondingly 4, 2, 1 and 0.3 hrs, respectively.

Figure 3A:
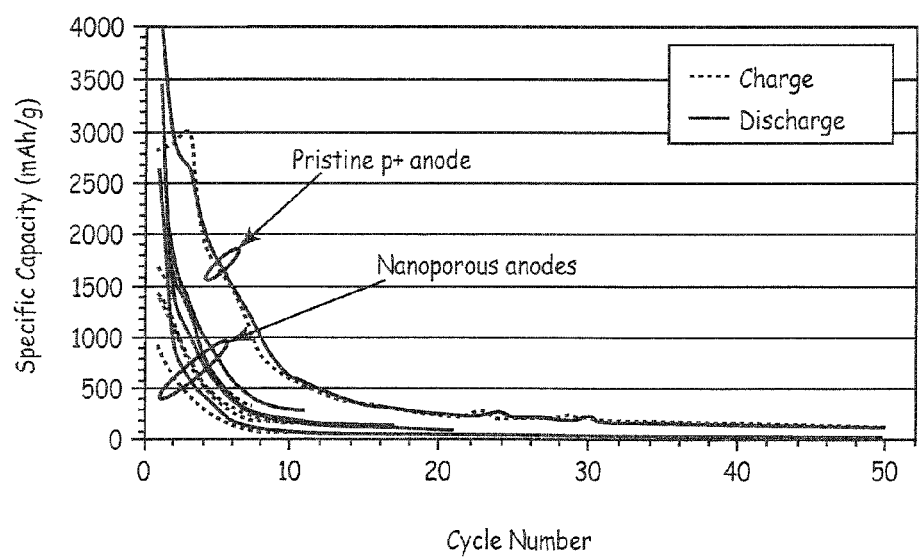
FIG. 3a is a graph containing plots of specific discharge capacity versus cycle number for a battery fabricated from a pristine p+ silicon negative electrode, and for batteries fabricated from nanoporous p+ silicon negative electrodes formed by different electrochemical etching conditions.
Figure 3B:
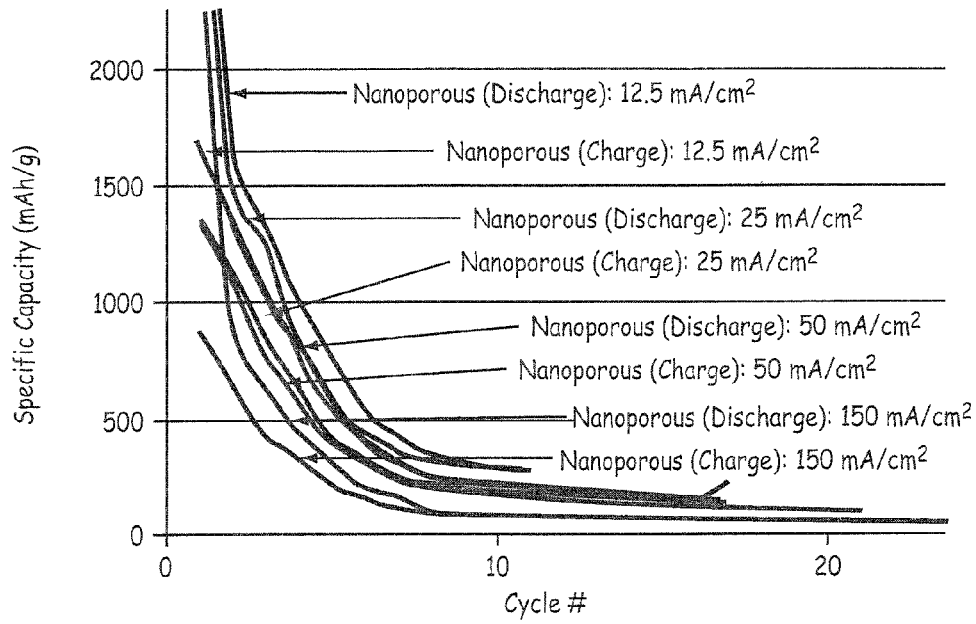
FIG. 3b is an enlargement of a portion of the plots of FIG. 3a with results for the battery fabricated from pristine p+ silicon negative electrode omitted.

The batteries were cycled between 0.01V and 1.5V at a rate of C/20 for the first two cycles, C/10 for cycles 3 and 4, C/5 for cycles 5 and 6, and the remaining cycles at C/3. In general, batteries comprising nanostructured silicon electrodes did not have improved cycling performance, as evaluated with specific discharge capacity, relative to batteries constructed from pristine p+ silicon electrodes. FIGS. 3a and 3b are graphs containing plots of the specific charge and discharge capacities versus cycle number for the batteries formed as described above. FIG. 3b is an enlargement of FIG. 3a, omitting the results for the battery comprising a pristine p+ silicon electrode and reproduced for clarity. FIG. 3a reveals that batteries formed from nanoporous silicon electrodes had decreased specific discharge capacity relative to the battery formed from a pristine p+ silicon electrode. However, with respect to the batteries formed with nanoporous silicon electrodes, FIG. 3b shows that better cycling performance can be achieved when nanoporous silicon electrode active materials are formed at lower etching currents and longer etching times. In particular, the battery comprising the porous silicon electrode formed by etching at 12.5 mA/cm$^2$ had better cycling performance relative to the batteries comprising porous silicon electrodes formed by etching at higher current densities and shorter etching times.

Performance: Effect of Non-Active Electrically Conducting Components

To demonstrate the effects of coatings and/or buffer materials on negative electrode active materials, seven batteries were formed with lithium foil negative electrodes as described above and with various silicon-based electrode compositions. Also, a battery was formed with an electrode comprising pristine p+ silicon ("pristine negative electrode").

Five batteries were formed with silicon-based electrode active compositions comprising nanoporous p+ silicon obtain by electrochemically etching p+ silicon wafer at 12.5 mA/cm$^2$ for 4 hrs ("nanoporous silicon electrodes"), as described above in this example. Of the batteries formed from nanoporous silicon electrodes, the silicon-based electrode active materials comprised carbon fiber or no carbon fiber and further comprised a metallic carbon coating, a pyrolytic carbon coating, or no coating. A summary of silicon-based electrode compositions for each battery tested is listed in Table I below.

TABLE I

| Battery Number | Structure | Non-Active Electrically Conducting Component |
|---|---|---|
| 1 | Pristine | None |
| 2 | Nanoporous | None |
| 3 | Nanoporous | Carbon Fiber |
| 4 | Nanoporous | Pyrolytic Carbon |
| 5 | Nanoporous | Silver and Carbon Fiber |
| 6 | Nanoporous | Silver |
| 7 | Nanoporous | Copper |

Figure 4:
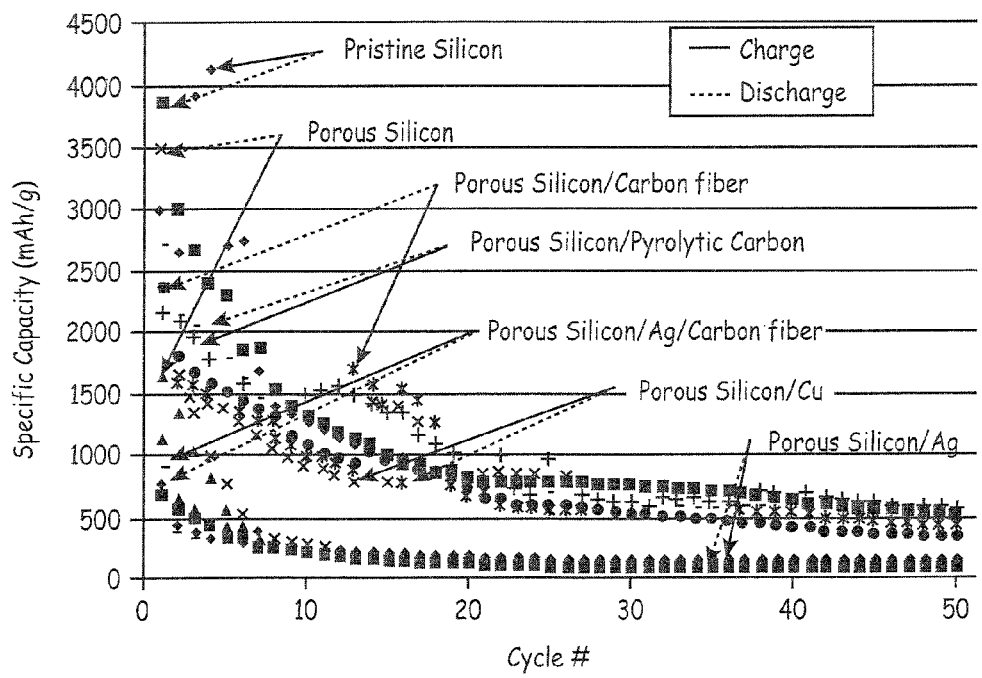
FIG. 4 is a graph containing plots of specific discharge capacity versus cycle number for a battery fabricated from a pristine p+ silicon negative electrode, and for a batteries fabricated from a nanoporous p+ silicon negative electrodes formed with or without various active or non-active conducting components.

Generally, it was seen that although the batteries formed from pristine p+ silicon electrodes had improved cycling performance relative to batteries formed from nanoporous silicon electrodes, the addition of non-active conducting components to the nanoporous silicon electrode active material greatly improved the cycling performance of batteries formed therefrom. FIG. 4 is a graph containing plots of specific charge and discharge versus cycle number for the batteries listed in Table I. FIG. 4 shows that the battery formed from the pristine p+ silicon electrode (Battery 1) had improved cycling performance relative to the battery formed from the nanoporous silicon electrode without any non-active conducting components (Battery 2). However, batteries formed from nanoporous silicon electrodes comprising a copper coating or a pyrolytic carbon coating, and/or carbon fiber (Batteries 3, 4, and 7) had improved cycling performance relative to the battery formed with the pristine p+ silicon electrode (Battery 1). Furthermore, the battery formed from the nanoporous silicon electrode comprising a pyrolytic carbon coating (Battery 4) had moderately improved cycling performance relative to the battery formed from the nanoporous silicon electrode comprising carbon fiber (Battery 3). The batteries formed with a silver non-active conducting component (Batteries 5 and 6) showed the least desirable cycling performance of all batteries tested in Table I.

Example 2

Cycling Performance: Effect of Pyrolytic Carbon Coating Composition with NanoSilicon Particles This example demonstrates the effect of variations in pyrolytic carbon coating formation on the performance nanoparticle silicon in coin cell batteries.

To demonstrate cycling performance, 3 coin cell batteries were formed as described above with a lithium foil negative electrode and various positive electrode compositions. Specifically, a battery was formed from a silicon-based active composition comprising nanoparticle silicon having an average primary particle size of 50-100 nm from Nanostructured and Amorphous Materials, Inc. Two batteries were formed with negative electrodes comprising a silicon-based active composition having a pyrolytic carbon coating formed from carbonization of either glucose or citric acid at high temperatures to form a hard carbon coating.

Figure 5:
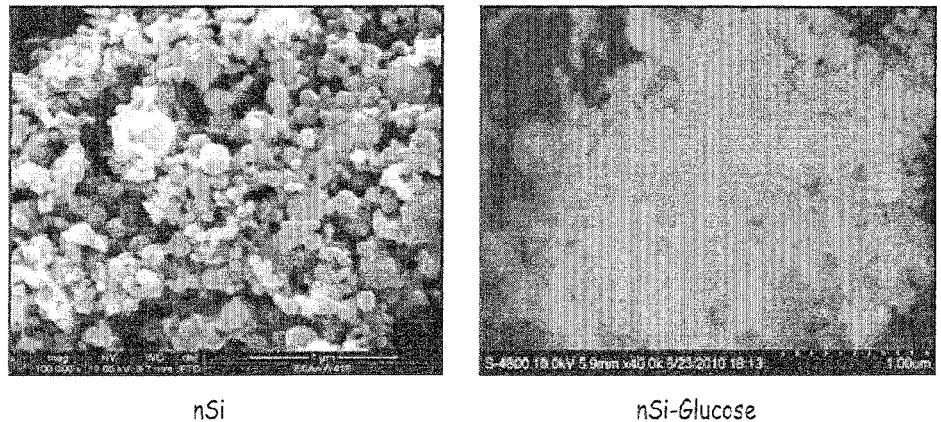
FIG. 5 is a composite of SEM images of silicon nanoparticles without (left panel) and with (right panel) a pyrolyitic carbon coating.

The carbonization of glucose and citric acid was done with two separate approaches. Glucose was dissolved in water and mixed with the silicon nanoparticles. A one gram quantity of nano-Si was dissolved in 10 ml of dionized (DI) water and 0.5 gm of glucose was added to the mixture. The solution was then ultrasonically mixed for 1 hr. The obtained solution was transferred to a Teflon® vessel and hydrothermally treated at 200° C. for 12 hrs. After cooling down to room temperature, the solution was washed with DI water and filtered to obtain the solid precursors. The solid precursor was further dried at 80° C. in a vacuum oven for 4 hrs. The dried solid precursor was taken in a ceramic crucible and fired in a tube furnace at 750° C. for 4 hrs. The heating rate of 10° C./min was used. After the heat treatment, the carbon coated nano-silicon was ground using a mortar and pestle to obtain fine powders. The final sample had a carbon coating of around 15-20%, by weight. FIG. 5 is a composite of scanning electron microscopy images obtained of the nano-silicon as obtained (left panel) and after hydrothermal carbonization of glucose (right panel).

To form the pyrolytic carbon coated nano-silicon from citric acid, 20 g of citric acid was dissolved in 50 mL of ethanol. To this mixture, 2 g of nano-Si was added under continuous stirring. To improve the mixing process, the mixture was ultrasonically treated for 1 hr. Then, ethanol was allowed to evaporate at room temperature while stirring to obtain a solid precursor. The dried solid precursor was heat treated in a tube furnace at 600° C. for 4 hr at a heating rate of 2.5° C./min under an argon atmosphere. The carbon content in the final sample was around 20-25%, by weight.

Figure 6:
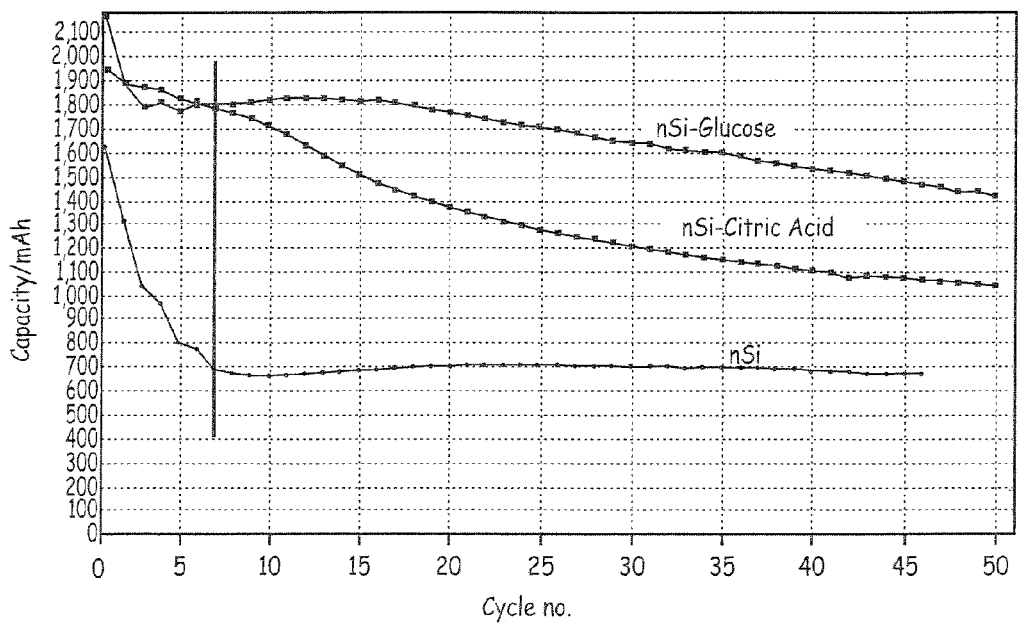
FIG. 6 is a graph containing plots of specific discharge capacity versus cycle number for batteries formed from negative electrodes comprising a silicon-based active composition with and without a pyrolytic carbon coating.

The batteries were formed as described above, and cycled between 1.5V and 0.01 V at a rate of C/20 for the first two cycles, C/10 for cycles 3 and 4, C/5 for cycles 5 and 6, and the remaining cycles at C/3. Generally, batteries formed from silicon-based electrode active material comprising a pyrolytic carbon coating had improved cycling performance relative to batteries formed without a pyrolytic carbon coating. FIG. 6 is a graph containing plots of specific discharge capacity versus cycle number for batteries formed from negative electrodes with and without a pyrolytic carbon coating. The batteries wherein the negative electrode active material comprised a pyrolytic, hard, carbon coating had significantly improved cycling compared with the battery wherein the negative electrode active material did not comprise a pyrolytic carbon coating. Specifically, the batteries exhibited very large specific discharge capacities out to 50 cycles. Moreover, with respect to batteries fabricated from silicon-based electrodes active materials comprising a pyrolytic carbon coating, the battery comprising a pyrolytic carbon coating formed from glucose had improved cycling performance compared with the battery comprising a pyrolytic carbon coating formed from citric acid. In particular, the pyrolytic carbon coating reduced the irreversible capacity loss from 38%, for the battery fabricated from silicon-based electrode active materials without a pyrolytic carbon coating, to about 26% and 24% for the battery fabricated from silicon-based electrode active materials comprising a pyrolytic carbon coating formed from glucose and citric acid, respectively. Additionally, at the end of 50 cycles, the battery formed from nano-silicon electrode active material without a pyrolytic carbon coating retained only about 40% of its capacity while the batteries formed from nanosilicon electrode active materials comprising a pyrolytic carbon coating retained 60% and 80% of their capacities for pyrolytic carbon coatings formed from citric acid and glucose, respectively.

Example 3

Cycling Performance: Carbon-Silicon-Hard Carbon Composites

This example demonstrates the performance of coin cell batteries fabricated from electrodes formed from active materials comprising graphitic carbon-silicon-hard carbon coated composites (CSi—HC).

Formation of CSi—HC Electrodes

Composite precursor materials were prepared by ball milling. In particular, an appropriate amount of powdered silicon particles (Sigma-Aldrich, −325 mesh), surface modified graphite (A3-MagD), and polyacrylonitrile (Sigma-Aldrich) in n-methyl-2-pyrrolidone was added to a ball mill. A slurry was created by milling for 1 hr to 15 hr at a milling rate of 150 rpm-300 rpm. The milled slurry was then transferred to a vacuum oven and dried at 100° C. for 3 hours. The dried mixture was then transferred to a furnace and the polyacrylonitrile was carbonized in at 900° C. under a nitrogen atmosphere for 140 min to 240 min to form pyrolytic hard carbon. Carbon (graphite)-silicon-hard carbon composites used in this example comprised $Si_{18}HC_{17}Gr_{65}$ (51.8 wt % graphite, 34.5 wt % silicon, and 13.7 wt %) hard carbon coating.

Silicon based electrodes were formed from the CSi—HC composite active material ("CSi—HC electrode") as describe above. In particular, silicon based electrodes were formed with a substantially uniform laminate thickness of about 18 μm to about 60 μm.

Effect of Lamination Thickness on Cycling Performance

To demonstrate the effect of lamination thickness on cycling performance, 3 coin cell batteries were formed as described above. In particular, the batteries were formed from a lithium foil negative electrode and CSi—HC positive electrodes with varying laminating thickness. The first, second, and third batteries comprised CSi—HC positive electrodes laminated with a coating gap of 18 μm, 26 μm, and 60 μm, respectively. The batteries were cycled by charging and discharging between 0.01V and 1.5V at a rate of C/20, C/10, C/5, and C/3 for the 1st and 2nd cycles, for the 3rd and 4th cycles, for the 5th and 6th cycles, and for subsequent cycles. Results are summarized in Table II, below (In Table II, "specific capacity" has been abbreviated as "SC").

Figure 7:
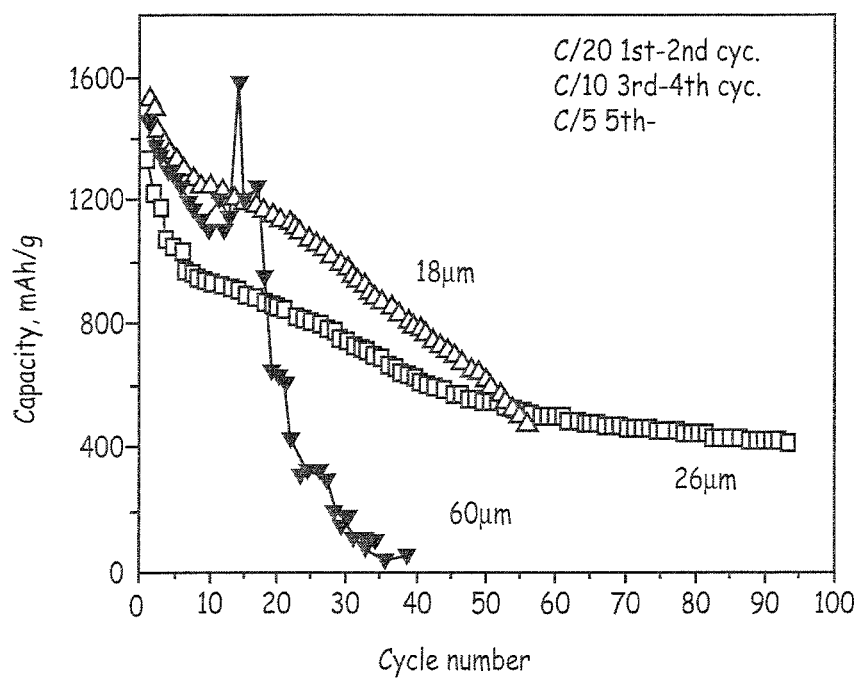
FIG. 7 is a graph containing plots of specific discharge capacity versus cycle number for batteries fabricated with a lithium foil negative electrode and with positive electrodes comprising carbon-silicon-hard carbon composite active materials with varying lamination thicknesses.

Generally, it was seen that increased positive electrode lamination thickness decreased battery performance. FIG. 7 is a plot of specific discharge capacity versus cycle number for the batteries fabricated from positive electrodes comprising CSi—HC composites with varying degrees of lamination thickness. FIG. 7 reveals that the battery formed from the CSi—HC positive electrode with a smaller lamination thickness had improved cycling performance relative to battery formed from CSi—HC positive electrodes with a greater lamination thickness. In particular, after 50 cycles and relative to the 5th discharge cycle, the battery formed with the CSi—HC positive electrode with a lamination thickness of 18 μm retained 52% of its discharge capacity while the battery formed with the CSi—HC positive electrode with a lamination thickness of 26 μm retained 46% of its discharge capacity. The battery formed from the CSi—HC positive electrode with a lamination thickness of 60 μm failed due to dendrite formation before the 50th cycles.

TABLE II

| Loading (mg/cm$^2$) | Coating Thickness (μm) | Density (g/cm$^3$) | Capacity per Unit Area (mAh/cm$^2$) | IRCL (%) | Second Charge SC/ First Charge SC (%) | First Charge Capacity (mAh/g) |
|---|---|---|---|---|---|---|
| 1.14 | 18 | 0.63 | 1.32 | 21.70% | 91% | 1335 |
| 1.53 | 26 | 0.59 | 1.78 | 18.30% | 94.90% | 1453 |
| 4.71 | 60 | 0.79 | 5.46 | 17.10% | 95% | 1526 |

Performance with HCMR™ Cathodes

To demonstrate the effect of positive electrode composition on battery cycling performance, 2 batteries were formed. A first battery was fabricated from a HCMR™ positive electrode and a CSi—HC negative electrode ("CSi—HC/HCMR battery") with a CSi—CH laminate thickness of 60 μm, both electrodes formed as described above. The first battery was balanced with 33% excess negative electrode capacity, which is evaluated based on the first charge capacity of the HCMR and the first discharge capacity of the silicon based anode. The capacities for balance are determined in cells with the respective electrodes placed against a lithium foil and operated from 10 mV-1.5V for the silicon based electrode and 0.5V-4.6V for the HCMR electrode both at a rate of C/20. A second battery was fabricated from a HCMR positive electrode and a lithium foil negative electrode ("Li/HCMR" battery), both electrodes formed as described above. The CSi—HC/HCMR batteries were cycled by charging and discharging between 4.6V and 0.5V at a rate of C/20, C/10, C/5, and C/3 for the 1st and 2nd cycles, for the 3rd and 4th cycles, for the 5th and 6th cycles, and for subsequent cycles, respectively, and the Li/HCMR batteries were cycled between 4.6V and 0.5V with the same rates as the CSi—HC/HCMR battery.

Figure 8:
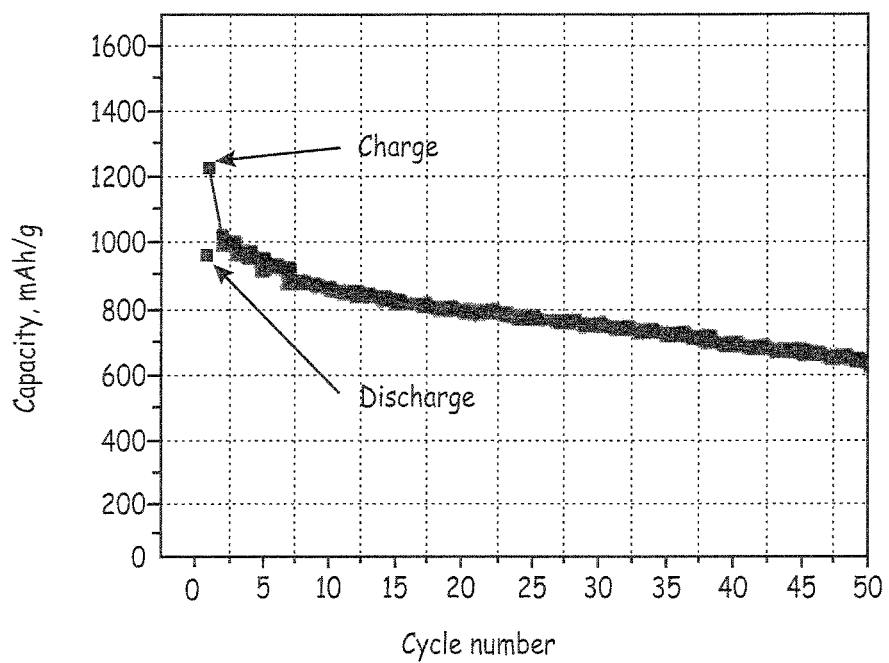
FIG. 8 is a graph containing plots of specific charge and discharge capacity versus cycle number for batteries fabricated from a HCMR™ positive electrode and a negative electrode comprising a carbon-silicon-hard carbon composite active material, the specific capacities calculated based upon the mass of the negative electrode active material.

Relative to the battery fabricated from a lithium foil negative electrode and a CSi—HC positive electrode ("Li/CSi—HC battery"), the CSi—HC/HCMR battery had improved cycling performance. FIG. 8 is a graph containing plots of specific discharge capacity versus cycle number for the CSi—HC/HCMR battery. The first cycle IRCL for this battery was 21.4% of the initial charge capacity. In particular, plots are shown for specific charge and discharge capacities calculated based upon the mass of the negative electrode. Comparison of FIGS. 7 and 8 shows the Li/CSi—HC battery with a CSi—HC laminate thickness of 60 μm failed before 50 cycles whereas the CSi—HC/HCMR battery with a CSi—HC laminate thickness of 60 μm retained 72% of its capacity at the 50th cycle (relative to the 7th cycle). Moreover, the cycling performance of the CSi—HC/HCMR battery had superior cycling performance to all CSi—HC/Li batteries tested in this example.

Figure 9:
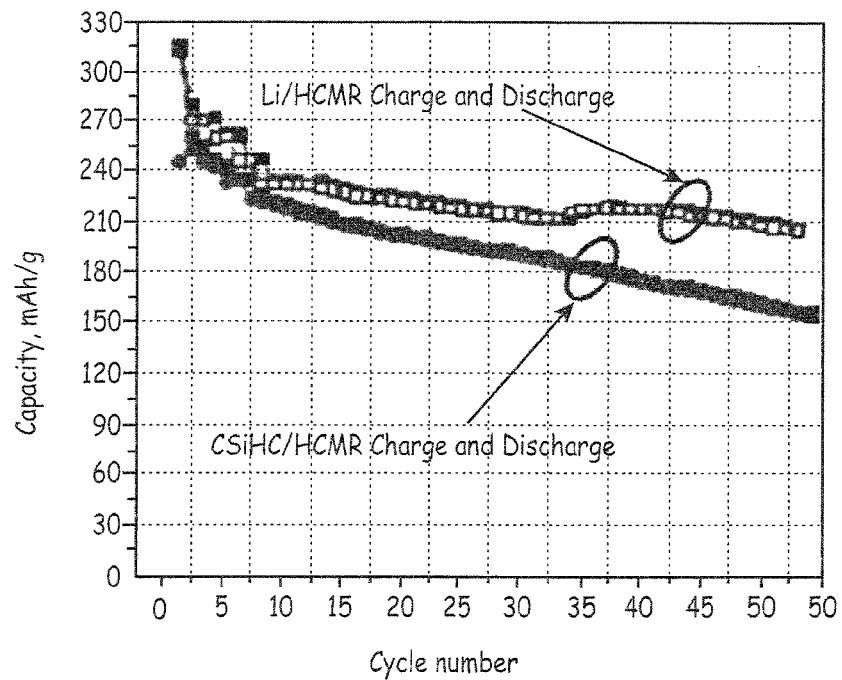
FIG. 9 is a graph containing plots of specific charge and discharge capacity versus cycle number for a batteries fabricated from a HCMR™ positive electrode, and fabricated from a negative electrode comprising lithium foil or a carbon-silicon-hard carbon composite active material, the specific capacities calculated based upon the mass of the positive electrode active material.

Relative to Li/HCMR batteries, CSi—HC/HCMR had decreased cycling performance. FIG. 9 is a graph containing a plot of specific charge and discharge capacities calculated based upon the mass of the positive electrode. FIG. 9 reveals that the Li/HCMR battery had improved cycling relative to the CSi—HC/HCMR battery. In particular, as mentioned above, the CSi—HC/HCMR battery retained 72% of its capacity (relative to the 7th cycle). On the other hand, the Li/HCMR battery retained about 84% of its capacity after the 50th cycle (relative to the 7th cycle).

Effect of Cycling on the Structure of CSi—HC Negative Electrodes

Figure 10:
FIG. 10 is a composite of SEM images of electrodes comprising a carbon-silicon-hard carbon composite active material without cycling (left panel), cycled 15 times (middle panel), and cycled 100 times (right panel).

To evaluate the effect of cycling on the structure of CSi—HC negative electrodes, 2 CSi—HC/HCMR batteries were formed and cycled as described above. The first battery was cycled 15 times and the second battery was cycled 100 times. Additionally, for comparison a CSiHC electrode was examined without assembly into a battery. CSi—HC electrodes were subject to physical degradation over long cycles. FIG. 10 is a composite of SEM images taken of CSi—HC electrodes. In particular, the left panel displays a SEM image of the non-cycled CSi—HC electrode. The center panel and the right panel display SEM images of the CSi—HC negative electrodes taken from the CSi—HC/HCMR batteries cycled 15 times and 100 times, respectively. FIG. 10 shows at long cycles, the CSi—HC material has undergone significant structural changes, including the formation of large cracks.

Example 4

Cycling Performance: Carbon Fiber-Silicon Composites

This example demonstrates the performance of coin cell batteries fabricated from silicon-based electrodes formed from active materials comprising carbon fiber-silicon ("CFSi") composites.

Formation of CFSi Composites and Corresponding Electrodes

Figure 11:
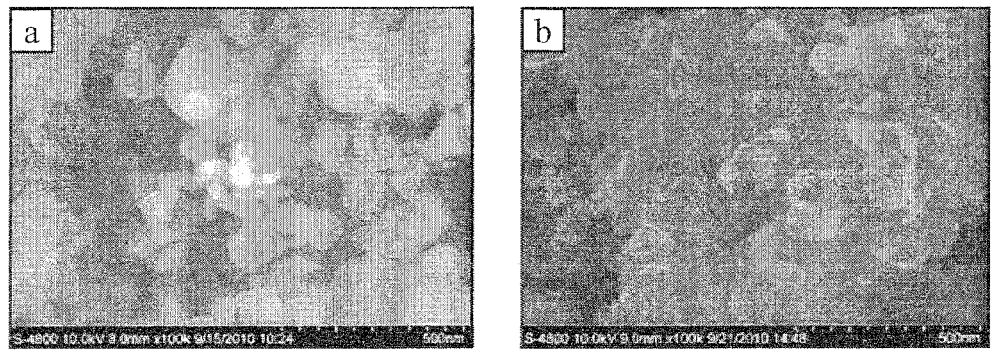
FIG. 11 is a composite of SEM images of silicon nanoparticles without (left panel) and with (right panel) a hard carbon coating.

Carbon fiber-silicon composite materials were prepared by first forming a carbon coating on nanosilicon particles and subsequently milling the carbon coated nanosilicon with carbon fiber. To form the carbon coating, an appropriate amount of polyvinyl chloride ("PVC") was mixed with tetrahydrofuran ("THF") to from a PVC-THF solution. An appropriate amount of nanosilicon (Nanostructured & Amorphous Materials, Inc.) was then added to the PVC-THF solution and dispersed by ultrasonication for one hour to form a mixture. After ultrasonication, the mixture was vigorously stirred until the THF was completely dried and the resulting PVC-nanosilicon mixture was then heat treated for 1 hour at 900° C. in an argon atmosphere to carbonize the PVC. After the carbon coating process, the sample was removed from the tube furnace and ground using a mortar and pestle, and the powder was sieved through 44 micron mesh screen. The carbon coating nanosilicon was about 20 wt % carbon and about 80 wt % silicon. FIG. 11 is a composite of SEM images of the uncoated nanosilicon (left panel) and the carbon coated nanosilicon (right panel).

The carbon coated Si-carbon fiber composite was prepared by mixing 85% by weight of sieved carbon coated silicon with 15% by weight of carbon fiber using a jarmill. The required materials were taken in a plastic jar with some zirconia milling balls. The jar was allowed to mix for one hour and the contents of the jar were collected for anode preparation process. There is no sieving step involved after the Jarmill mixing process. Electrodes were formed from the CFSi composite as described above.

Cycling Performance

To demonstrate cycling performance for batteries fabricated from CFSi composite electrodes, 3 coin cell batteries were formed with lithium foil counter electrodes or with HCMR™ electrodes, in which the batteries and electrodes were formed as described above. A first battery was fabricated from a CFSi composite based electrode and a lithium foil negative electrode ("CFSi/Li battery"). A second battery was fabricated from a negative electrode comprising CFSi and a HCMR™ positive electrode ("non-lithiated CFSi/HCMR battery"). A third battery, comprising 0.8 mg supplemental lithium to compensate for irreversible capacity loss, was fabricated from a lithiated CFSi negative electrode and a HCMR positive electrode ("lithiated CFSi/HCMR battery"). The CFSi/HCMR batteries were both balanced at 110% negative electrode capacity.

The batteries were cycled using different cycling protocols. The CFSi/Li battery cycling protocol comprised charging and discharging between 0.005V and 1.5V at a rate of C/20 for the 1st and 2nd cycles, at a rate of C/10 for 3rd and 4th cycles, at a rate of C/5 for the 5th and 6th cycles, and at a rate of C/3 for subsequent cycles. During the intercalation/alloying part of the cycle, a constant current was applied until a voltage of 0.005V was reached and then a constant voltage was applied until the current reached C/50. The cycling protocol for the non-lithiated and lithiated CFSi/HCMR batteries comprised charging and discharging after the first cycle between 4.5V and 1.0V, and 4.5V and 1.5V, respectively at a rate of C/20 for the first cycle (between 4.6V and 1.0V), at a rate of C/10 for the 2nd cycle, at a rate of C/5 for the 3rd and 4th cycles, and at a rate of C/3 for subsequent cycles. Capacity retention for the CFSi/Li and CFSi/HCMR batteries were measured relative to the specific discharge capacities at 7th and 5th cycles, respectively.

Figure 12:
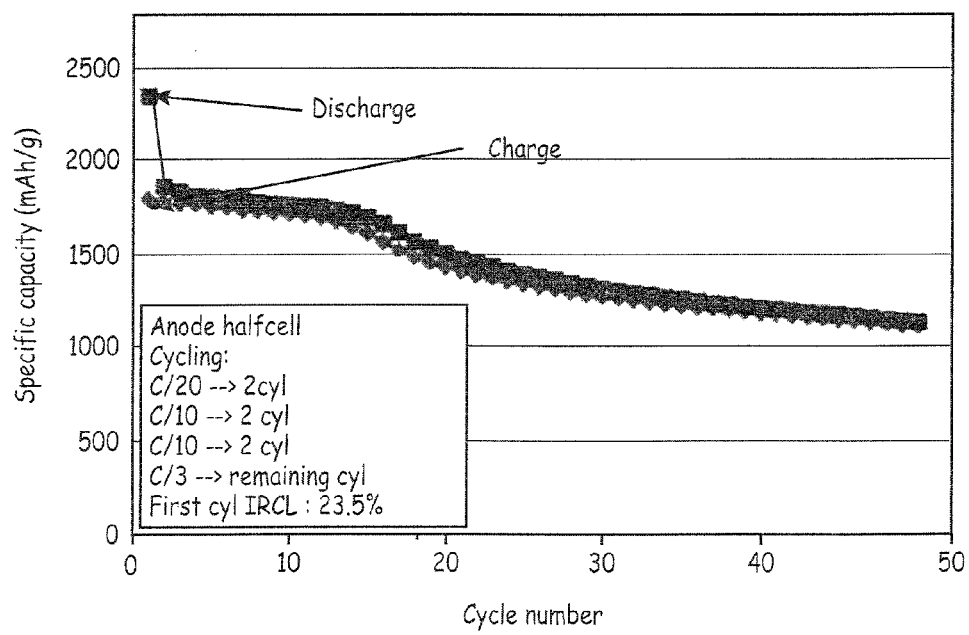
FIG. 12 is a graph containing plots of specific charge and discharge capacity versus cycle number for batteries formed with a lithium foil negative electrode and a positive electrode comprising a carbon-silicon composite active material.
Figure 13:
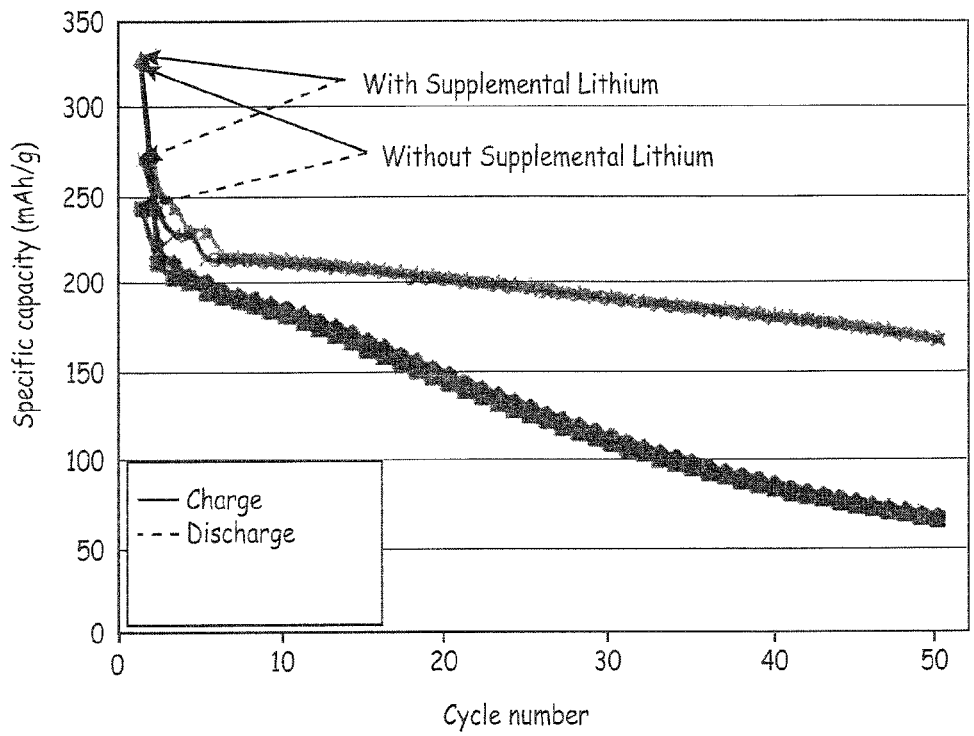
FIG. 13 is a graph containing plots of specific charge and discharge capacity versus cycle number for batteries, with and without supplemental lithium, fabricated from a HCMR™ positive electrode and a negative electrode comprising a carbon fiber-silicon composite, the specific capacities calculated based upon the mass of the positive electrode active material.

FIGS. 12 and 13 are graphs containing plots of specific charge and discharge capacities versus cycle number for the CFSi/Li battery and CFSi/HCMR batteries, respectively. The specific capacities were calculated based upon the mass of the active materials in the negative electrode and positive electrode in FIGS. 12 and 13, respectively. Comparison of FIGS. 12 and 13 shows that while the CFSi/Li battery had 63% capacity retention after 50 cycles, the capacity retention of the non-lithiated and lithiated CFSi/HCMR batteries was about 32% and 78%, respectively. Furthermore, FIG. 13 shows the lithiated CFSi/HCMR battery had a decreased first cycle IRCL (about 18%) relative to the non-lithiated CFSi/HCMR battery (about 25%).

Relative to CFSi/Li batteries, non-lithitated CFSi/HCMR batteries exhibited increased fade with cycling. In general, batteries with positive electrodes comprising an LMO, both electrodes can contribute to the fade. Also, there is no reason to believe that the fade of the silicon-based anode will be the same for a lithium foil counter electrode and a LMO counter electrode. Thus, the performance measurements with an LMO electrode are more realistic with respect to silicon-based electrodes that are intended for actual eventual use with an LMO-based electrode. Lithiated CFSi/HCMR batteries had significantly improved cycling performance with respect to reduced fade of the capacity. The improved performance of the lithiated CFSi/HCMR battery may suggest that decreased capacity fade is at least partially attributed to the stabilization of the CFSi negative electrode by supplemental lithium.

Figure 14:
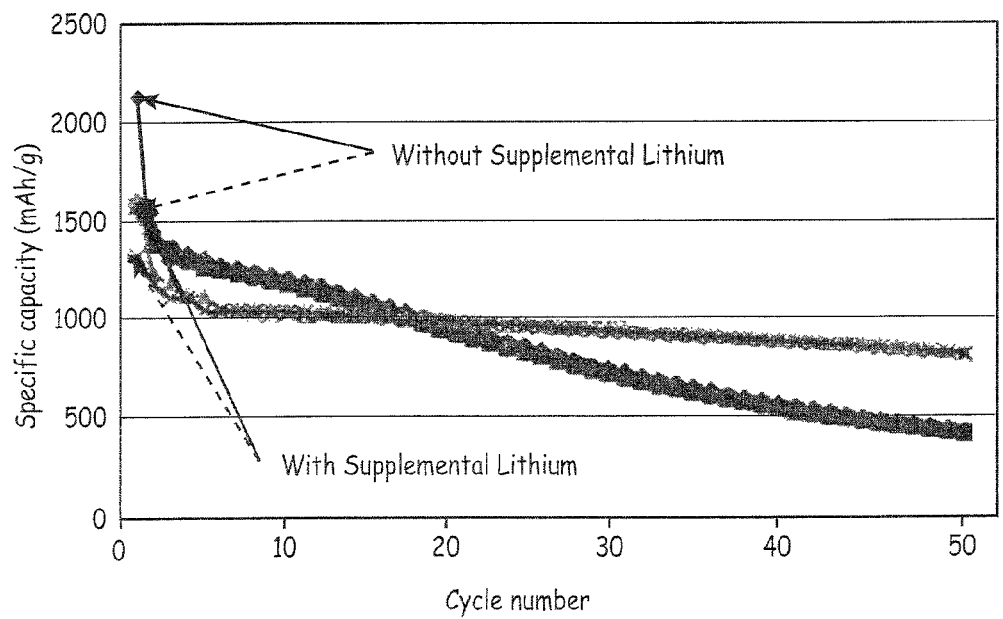
FIG. 14 is a reproduction of the data displayed in FIG. 13, the specific capacities re-calculated based upon the mass of the negative electrode active material.

FIG. 14 is a graph containing plots of specific charge and discharge capacities versus cycle number for the non-lithiated and lithiated CFSi/HCMR batteries. The data displayed in FIGS. 13 and 14 were obtained from the same measurements of discharge capacity during cycling, however, the specific discharge capacities displayed in FIG. 14 were calculated based upon the mass of the negative electrode. As shown in FIG. 14, the non-lithiated CFSi/HCMR battery has a larger specific discharge capacity relative to the lithiated CFSi/HCMR battery at early cycles, due to the fact that weight of the CFSi negative electrode is relatively smaller in the non-lithiated battery since the battery is balanced based on the presence of the SLMP® powder. Note that adjusting for the supplemental lithium, both batteries were balanced at 110%. However, after about the 18th cycle, the specific discharge capacity of the non-lithiated CFSi/HCMR battery faded below specific discharge capacity of the lithiated CFSi/HCMR battery even though the negative electrode of the lithiate CFSi/HCMR battery was relatively larger for a given weight of positive electrode active material. Based on the significant reduction in fade with cycling, this result is consistent with stabilization of the CFSi negative electrode by the presence of supplemental lithium although evaluating this issue is complicated by the potential contribution to the fade by the positive electrode.

Example 5

Cycling Performance: Silicon-Metal Alloy Composites

This example demonstrates the cycling performance of coin cell batteries formed from active materials comprising silicon-metal intermetallic alloy composites with carbon fibers.

Figure 15:
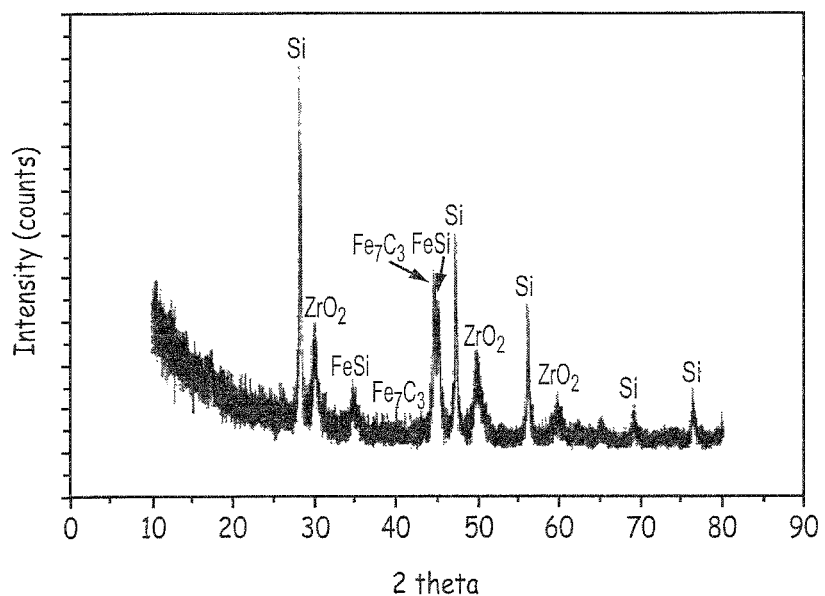
FIG. 15 is graph containing a plot of intensity versus scattering angle generated by x-ray diffraction measurements of a silicon-metal intermetallic alloy composite active material.

Silicon-Iron-Carbon Fiber ("Si—Fe—CF") intermetallic alloy composite materials were prepared by high energy mechanical milling with a zironia milling medium. Precursor materials were 325 mesh micron scale silicon (Sigma-Aldrich), iron powder with about 44 micron particle size (Sigma-Aldrich) and carbon nanofibers. To component materials were taken together in the proportion $Si_{70}Fe_{15}CF_{15}$ in a high energy ball mill jar with zirconia media and ground at 300 rpm for 5 hrs. After grinding, the materials were collected and sieved through a 44 micron sieve. The Si—Fe—CF composites used in this example can be described by the formula $Si_{70}Fe_{15}CF_{15}$ wherein the "CF" is the carbon fiber component of the composite and wherein silicon, iron, and carbon fiber are present in about 65.8 wt %, 27.5 wt %, and 6 wt %, respectively. FIG. 15 is graph containing a plot of intensity versus scattering angle obtained by x-ray diffraction measurements ("XRD") of the synthesized $Si_{70}Fe_{15}CF_{15}$ intermetallic alloy composite, indicating that alloying has taken place during milling. The $ZrO_2$ intensities are due to trace amount of zirconia from milling components mixed with the active material.

Non-lithiated and lithiated (with supplemental lithium) negative electrodes were formed from the $Si_{70}Fe_{15}CF_{15}$ intermallic alloy composite. In particular, electrodes ("SiFe—CF electrode" and "lithiated SiFe—CF electrode") were formed as described above.

To demonstrate cycling performance, 3 coin cell batteries were formed as described above. A first battery was fabricated form a SiFe—CF electrode and a lithium foil electrode ("SiFe–CF/Li battery"). A second battery was fabricated from a SiFe—CF negative electrode and a HCMR positive electrode ("non-lithiated SiFe—CF/HCMR battery"). A third battery was fabricated from a lithiated SiFe—CF negative electrode and a HCMR positive electrode ("lithiated SiFe—CF/HCMR battery"). The HCMR positive electrodes were formed as described above.

The batteries were cycled using different cycling protocols. The SiFe—CF/Li battery cycling protocol comprised charging and discharging between 1.5V and 0.005V at a rate of C/20 for the 1st and 2nd cycles, at a rate of C/10 for 3rd and 4th cycles, at a rate of C/5 for the 5th and 6th cycles, and at a rate of C/3 for subsequent cycles. The discharge (lithium intercalation/alloying into the anode) process involved two steps. One step involved a constant current until the voltage reached 5 mV, and a constant voltage step was used until the current reached C/50. The charge (lithium de-intercalation/de-alloying from the anode) process involved only a constant current step until the voltage reached 1.5V. The cycling protocol for the non-lithiated and lithiated SiFeCF/HCMR batteries comprised charging and discharging after the first cycle between 4.5V and 1.0V, and 4.5V and 1.5V, respectively, at a rate of C/10 for the 1st (between 4.6V and 1.0V) and 2nd cycles, at a rate of C/5 for the 3rd and 4th cycles, and at a rate of C/3 for subsequent cycles. Capacity retention for the SiFe—CF/Li and SiFe—CF/HCMR batteries were measured relative to the specific discharge capacities at 7th and 5th cycles, respectively.

Figure 16:
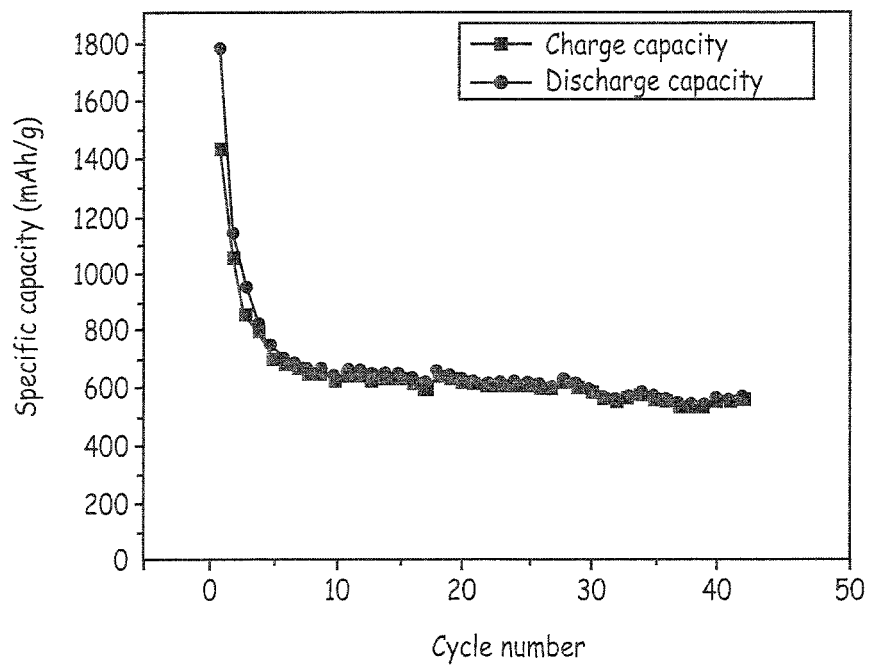
FIG. 16 is a graph containing plots of specific charge and discharge capacities versus cycle number for batteries fabricated from a lithium foil negative electrode and a positive electrode comprising a silicon-metal intermetallic alloy composite active material.
Figure 17:
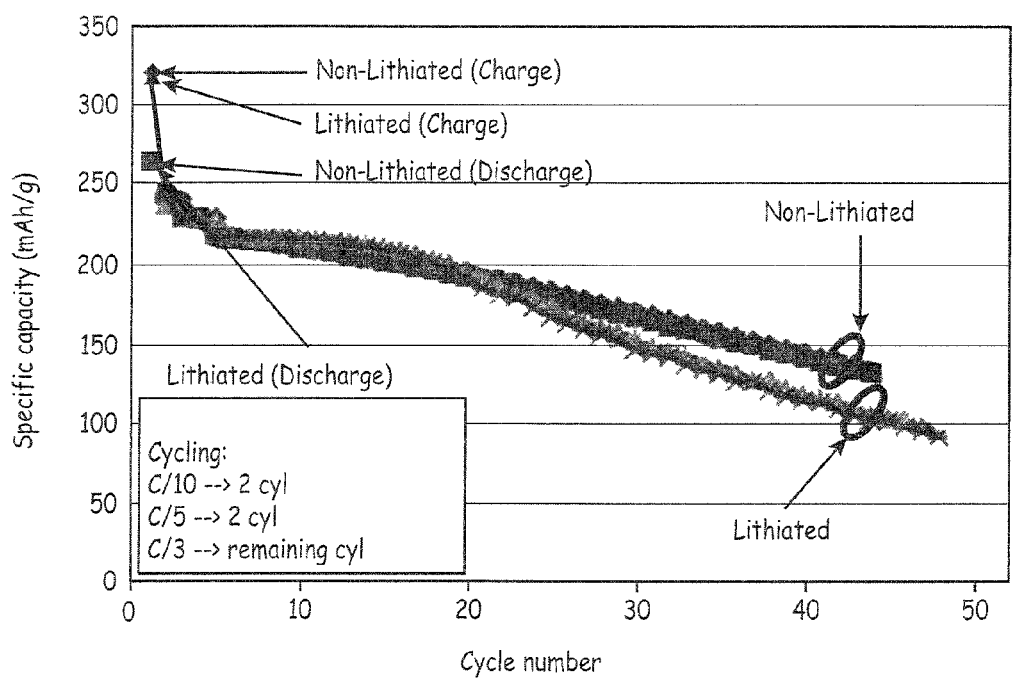
FIG. 17 is a graph containing plots of specific charge and discharge capacities versus cycle number for batteries, with and without supplemental lithium, fabricated from a HCMR™ positive electrode and a negative electrode comprising a silicon-metal intermetallic alloy composite active material, the specific capacities calculated based upon the mass of the active positive electrode material.

The SiFe—CF/Li battery showed reduced capacity fade relative to the SiFe—CF/HCMR batteries. As noted in Example 4, the capacity fade for batteries with an LMO based electrode can have contributions from both the positive electrode and the negative electrode. FIGS. 16 and 17 are graphs containing plots of the specific charge and discharged capacities versus cycle number for the SiFe—CF/Li and SiFe—CF/HCMR batteries, respectively. In particular, FIGS. 16 and 17 reveal that the SiFe—CF/Li retained about 86% of its capacity after 43 cycles. On the other hand, after the same number of cycles, the non-lithiated and lithiated SiFe—CF/HCMR batteries retained only about 60% and 46% of their capacities, also indicating that the presence of supplemental lithium in the lithiated SiFe—CF/HCMR battery did not improve cycling performance in this embodiment. Additionally, FIG. 17 shows that that both the non-lithiated SiFe—CF/HCMR batteries both had a first cycle IRCL of about 17%, indicating that the presence of supplemental lithium in the lithiated SiFeCF/HCMR battery did not decrease first cycle IRCL for this embodiment. Therefore, the silicon alloys exhibited significantly different behavior in response to the presence of supplemental lithium than has been observed with nanosilicon based active materials or with graphitic carbon active materials.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

This document was prepared as a result of work sponsored by the California Energy Commission. It does not necessarily represent the views of the Energy Commission, its employees, or the State of California. The Commission, the State of California, its employees, contractors, and subcontractors make no warranty, express or implied, and assume no legal liability for the information in this document; nor does any party represent that the use of this information will not infringe upon privately owned rights.

What we claim is:

1. A lithium ion battery comprising a positive electrode comprising a cycle-able lithium metal oxide, a negative electrode, a separator between the positive electrode and the negative electrode and supplemental lithium distinct from lithium associated with the lithium metal oxide and supplemental to cycling lithium supplied by the lithium metal oxide, the supplemental lithium being in an amount corresponding to about 2.5% to about 35% of the negative electrode capacity, wherein the negative electrode comprises an active material comprising a silicon-carbon composite material and has an average dry thickness of at least 25 microns, the active material having a tenth cycle specific capacity of at least 1000 mAh/g at a rate of C/3 and voltage range between 4.5V to 1.5V, and wherein the supplemental lithium is in the form of electroactive lithium or at least a portion of an SEI layer.

2. The lithium ion battery of claim 1 having an amount of supplemental lithium corresponding to at least 10% of the negative electrode capacity.

3. The lithium ion battery of claim 1 wherein the negative electrode comprises nanostructured silicon.

4. The lithium ion battery of claim 1 wherein the negative electrode has a specific capacity of at least about 1200 mAh/g at a rate of C/3.

5. The lithium ion battery of claim 1 wherein the lithium metal oxide can be approximately represented by the formula $Li_{1+b}Ni_\alpha Mn_\beta Co_\gamma A_\delta O_{2-z}F_z$, where b ranges from about 0.01 to about 0.3, $\alpha$ ranges from about 0 to about 0.4, $\beta$ range from about 0.2 to about 0.65, $\gamma$ ranges from 0 to about 0.46, $\delta$ ranges from 0 to about 0.15 and z ranges from 0 to about 0.2 with the proviso that both $\alpha$ and $\gamma$ are not zero, and where A is Mg, Sr, Ba, Cd, Zn, Al, Ga, B, Zr, Ti, Ca, Ce, Y, Nb, Cr, Fe, V, Li or combinations thereof.

6. The lithium ion battery of claim 1 having a first cycle irreversible capacity loss of no more than about 20% of the initial charge capacity for a charge to 4.6V.

7. A lithium ion battery comprising a positive electrode comprising a lithium metal oxide, a negative electrode, a separator between the positive electrode and the negative electrode and supplemental lithium wherein an amount of supplemental lithium corresponding to at least about 10% of the negative electrode capacity, wherein the negative electrode comprises a silicon based active material, electrically conductive components and a polymer binder, wherein the binder has an elongation of at least about 50% without tearing and a tensile strength of at least about 100 MPa, wherein the negative electrode has an average dry thickness of at least 25 microns, wherein the negative electrode can generate a capacity per unit area of at least about 3.5 mAh/cm$^2$ and wherein the negative electrode active material has a tenth cycle specific capacity of at least about 1000 mAh/g at a rate of C/3 and voltage range between 4.5V to 1.5V.

8. The lithium ion battery of claim 7 having a first cycle irreversible capacity loss of no more than about 20% of the initial charge capacity for a charge to 4.6V.

9. The lithium ion battery of claim 1 wherein the lithium ion battery further comprises a composite material comprising pyrolytic carbon coating, nanostructured silicon, and carbon nanofibers or graphitic carbon.

10. The lithium ion battery of claim 1 wherein after 50 charge-discharge cycles between 4.5V and 1.0V, the battery exhibits a negative electrode active material specific capacity of at least 750 mAh/g and a positive electrode active material specific capacity of at least about 150 mAh/g at a rate of C/3.

11. The lithium ion battery of claim 1 wherein the negative electrode further comprises carbon nanofibers.

12. The lithium ion battery of claim 7 wherein the negative electrode further comprises carbon nanofibers.

13. The lithium ion battery of claim 1 wherein after 50 charge-discharge cycles between 4.5V and 1.0V at a C/3 rate, the battery exhibits a negative electrode active material specific capacity of at least 850 mAh/g and a positive electrode active material specific capacity of at least about 160 mAh/g.

14. The lithium ion battery of claim 7 wherein after 50 charge-discharge cycles between 4.5V and 1.0V at a C/3 rate, the battery exhibits a negative electrode active material specific capacity of at least 850 mAh/g and a positive electrode active material specific capacity of at least 160 mAh/g.

* * * * *